United States Patent
Takano et al.

(10) Patent No.: US 6,356,406 B1
(45) Date of Patent: Mar. 12, 2002

(54) MAGNETIC STORAGE SYSTEM

(75) Inventors: Hisashi Takano; Yoshibumi Matsuda, both of Kodaira; Mikio Suzuki, Kokubunji, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 08/074,485

(22) Filed: Jun. 11, 1993

(30) Foreign Application Priority Data

Jun. 12, 1992 (JP) .................................. 4-153283

(51) Int. Cl.[7] .................................. G11B 5/52
(52) U.S. Cl. ..................... 360/81; 360/88; 360/101; 360/103
(58) Field of Search .................. 360/77.01, 77.03, 360/78.01, 78.11, 81, 88, 101, 104, 105, 106, 109, 128, 103

(56) References Cited

U.S. PATENT DOCUMENTS

| | | | | |
|---|---|---|---|---|
| 3,712,723 A | * | 1/1973 | Gerry | 353/69 |
| 4,636,893 A | * | 1/1987 | McClure | 360/63 |
| 4,853,810 A | * | 8/1989 | Pohl et al. | 360/103 |
| 5,107,099 A | * | 4/1992 | Smith | 235/449 |
| 5,172,282 A | * | 12/1992 | Ghose | 360/2 |
| 5,212,680 A | * | 5/1993 | Toupin | 360/88 |
| 5,325,244 A | * | 6/1994 | Takano et al. | 360/77.03 |

* cited by examiner

*Primary Examiner*—David Hudspeth
*Assistant Examiner*—Dan I. Davidson
(74) *Attorney, Agent, or Firm*—Antonelli, Terry, Stout & Kraus, LLP

(57) ABSTRACT

A multi-pattern is formed to have a plurality of read/write elements on a plane. A medium is formed on a single crystal of Si substrate. A motion of the head relative to the medium is made a simple harmonic motion to form linear recorded bits. This allows fabricating a storage system which provides features of small size, high recording density, high transfer rate, and short access time all at once. The recording density accomplished by the small storage system is extremely high, and may be as high as 10 gigabits per square inch.

117 Claims, 5 Drawing Sheets

MAGNETIC STORAGE SYSTEM

BACKGROUND OF THE INVENTION

The present invention relates to a large capacity storage or mass storage. More particularly, it concerns a storage system that provides a high density, a high-speed data transfer rate, and a shorter access time simultaneously.

A conventional magnetic disk storage system is a reliable storage system capable of reading massive amounts of data at a high speed. The conventional magnetic disk storage system performs a reading or writing operation or a seeking operation wherein a disk-like magnetic recording medium is rotated at a high speed, and a slider having a magnetic head element incorporated therein is floated above the magnetic recording medium by a gimbal and an arm. The volume of the magnetic disk storage system having the disk-like magnetic recording medium is determined by the diameter of the disk and the dimensions of a head drive system comprising the gimbal, the arm, and similar devices. To make the system smaller first, the diameter of the magnetic recording medium has to be made smaller first. Then, since a recording area for data on the magnetic recording medium has to be made as wide as possible, a spindle motor for rotating the magnetic recording medium has to be made smaller.

For the smaller magnetic recording medium, a rotational frequency of the spindle motor must be increased. If not, a speed of the head relative to the medium is decreased, resulting in a problem that the data transfer rate is decreased. To solve the problem, the spindle motor has to be rotated at a very high speed. To store as much data as possible in the limited area, a track width for the data has to be made narrower. This necessitates a highly accurate rotation of the magnetic recording medium to suppress its possible eccentricity during rotation. Note that the system cannot be made small unless the spindle motor is made as thin as possible. However, technical considerations place limits on how small the spindle motor can be made. Also, mechanical stiffness requirements and production costs place limits on how small a head seeking arrangement including the gimbal and the arm system for accurately moving the magnetic head to a desired track on the magnetic recording medium can be made.

SUMMARY OF THE INVENTION

In view of the foregoing, it is an object of the present invention to provide a storage system that can be truly small sized with a capability of storing data at a high density by way of solving the problems involved in the prior art discussed above and presenting measures to overcome technical difficulties to be further considered.

Briefly, the foregoing object is accomplished in accordance with aspects of the present invention by a storage system. The storage system is capable of storing, transferring, and accessing massive amounts of data at high speed in a way-that a recording medium or a read/write device can be moved at high speed and accuracy, seek time can be made shorter, and spacing between the recording medium and the read/write device can be narrower without using the disk-like magnetic recording medium.

The present invention provides a first feature in that (1) a magnetic storage system for making data reading or writing or both, wherein a data write/record device or a magnetic recording medium or both is reciprocated from position to position relatively different with both being kept to a predetermined distance; (2) the magnetic storage system of item 1 mentioned above wherein the data read/write device or the magnetic recording medium or both is driven by any of an arrangement for converting a rotation to reciprocal motion, a piezo device, and quartz crystal; (3) the magnetic storage system of item 1 mentioned above wherein the magnetic recording medium has a linear or circular series of recorded bits aligned thereon and in a reading or writing mode of operation, is reciprocated along the recorded bits while the read/write device is made still or to follow the recorded bits; (4) the magnetic storage system of item 1 mentioned above wherein the magnetic recording medium has a linear or circular series of recorded bits aligned thereon and in a reading or writing mode of operation, the read/write device is reciprocated along the recorded bits while the magnetic recording medium is made still or to follow the recorded bits; (5) the magnetic storage system of item 1 mentioned above wherein the magnetic recording medium has a linear or circular series of recorded bits aligned thereon and in a reading or writing mode of operation, the read/write device and the magnetic recording medium are reciprocated opposite to each other along the recorded bits while the read/write device or the magnetic recording medium is made to follow the recorded bits; (6) the magnetic storage system of item 1 mentioned above wherein the magnetic recording medium has a zigzag series of recorded bits aligned thereon and in a reading or writing mode of operation, the read/write device and the magnetic recording medium are reciprocated in their respective directions not in parallel to each other along the recorded bits; (7) the magnetic storage system of item 1 mentioned above wherein a plurality of the read/write devices are regularly provided on a two-dimensional plane; (8) the magnetic storage system of item 1 mentioned above wherein seeking is made by a one-dimensional motion of the read/write device; (9) the magnetic storage system of item 1 mentioned above wherein seeking is made by a two-dimensional motion of the read/write device; (10) the magnetic storage system of item 1 mentioned above wherein seeking is made by combination of a one-dimensional motion of the read/write device and a one-dimensional motion of the magnetic recording medium; (11) the magnetic storage system of item 1 mentioned above wherein seeking is made by a one-dimensional motion of the magnetic recording medium; (12) the magnetic storage system of item 1 mentioned above wherein seeking is made by a two-dimensional motion of the magnetic recording medium; and, (13) the magnetic storage system of item 1 mentioned above wherein the read/write device and the magnetic recording medium are made to contact each other through or not through a lubricant by a predetermined force.

The present invention provides a second feature in that (14) a magnetic storage system having a magnetic head and a magnetic recording medium combined for reading or writing a magnetic signal as data source mentioned above wherein the magnetic recording medium has a linear or circular series of recorded bits aligned thereon and in a reading or writing mode of operation, the magnetic recording medium is moved in a simple harmonic motion along the recorded bits while the magnetic head is made still or to follow a track; (15) the magnetic storage system of item 14 mentioned above wherein the magnetic head is a multi-head having a plurality of read/write devices regularly aligned on a plane; (16) the magnetic storage system of item 14 mentioned above wherein seeking is made by a one-dimensional motion of the magnetic head in the track width direction; (17) the magnetic storage system of item 14 mentioned above wherein seeking is made by a one-dimensional motion of the magnetic head in the recording bit direction; (18) the magnetic storage system of item 14 mentioned above wherein seeking is made by a two-dimensional motion of the magnetic head in the recording bit direction and the track width direction; (19) the magnetic storage system of item 14 mentioned above wherein seeking is made by combination of a one-dimensional motion of the magnetic head in the recording bit direction and a one-dimensional motion of the magnetic recording medium in the track width direction; (20) the magnetic storage system of item 14 mentioned above wherein seeking is made by combination of a one-dimensional motion of the magnetic head in the track width direction and a one-dimensional motion of the magnetic recording medium in the recording bit direction; (21) the magnetic storage system of item 14 mentioned above wherein seeking is made by a one-dimensional motion of the magnetic recording medium in the track width direction; (22) the magnetic storage system of item 14 mentioned above wherein seeking is made by a one-dimensional motion of the magnetic recording medium in the recording bit direction; (23) the magnetic storage system of item 14 mentioned above wherein seeking is made by a two-dimensional motion of the magnetic recording medium in the recording bit direction and the track width direction; (24) the magnetic storage system of item 14 mentioned above wherein a piezo device prompts a reciprocal motion of the magnetic recording medium or the magnetic head in the recording bit direction in the reading or writing mode of operation or prompts a motion of the magnetic head or the magnetic recording medium among adjacent elements of the magnetic head in the track width direction in a seeking operation; (25) the magnetic storage system of item 14 mentioned above wherein the magnetic recording medium is a square or polygon and has regular grooves formed on a surface thereof; (26) the magnetic storage system of item 25 mentioned above wherein the magnetic recording medium is formed on a Si substrate of single crystal and the regular grooves are formed by way of a chemical etching process with use of a crystalline orientation; (27) the magnetic storage system of item 25 mentioned above wherein the magnetic recording medium is for longitudinal magnetic recording or perpendicular magnetic recording and for the longitudinal magnetic recording, an easy axis is in parallel with the recording bit direction; (28) the magnetic storage system of item 14 mentioned above wherein positioning the magnetic head or the magnetic recording medium in the track width direction in the reading or writing mode of operation is based on position information written in between sectors of a single track; (29) the magnetic storage system of item 14 mentioned above wherein positioning the magnetic head or the magnetic recording medium in the track width direction in the reading or writing mode of operation is made in a way that the magnetic head has a semiconductor laser on a part thereof, a laser beam is incident on a surface of the magnetic recording medium, and a difference of a light emission condition of the semiconductor laser with presence or absence of a groove is converted to voltage change or a change of light intensity at a rear of the laser is detected; (30) the magnetic storage system of item 14 mentioned above wherein positioning the magnetic head or the magnetic recording medium in the track width direction in the reading or writing mode of operation in a way that the magnetic head has at least one detecting needle mounted thereon, and the at least one detecting needle is brought close to a surface of the magnetic recording medium to detect a change of a tunneling current with presence or absence of a groove; (31) the magnetic storage system of item 14 mentioned above wherein positioning the magnetic head or the magnetic recording medium in the track width direction in a seeking operation is made in a way that a number of grooves on a surface of the medium is counted on the basis of a change of an emission condition of a semiconductor laser or a tunneling current with the magnetic head or the magnetic recording medium moving in the track width direction; (32) the magnetic storage system of item 14 mentioned above wherein a contact force of the magnetic head with the magnetic recording medium is controlled with use of at least one piezo device; (33) the magnetic storage system of item 14 mentioned above wherein a contact force of the magnetic head with the magnetic recording medium is different, or higher in the reading or writing mode of operation than in a seeking operation; (34) the magnetic storage system of item 14 mentioned above wherein a volume is not greater than 40 cc; (35) the magnetic storage system of item 14 mentioned above wherein a single set of the magnetic head and the magnetic recording medium has data transferred therein in parallel; (36) the magnetic storage system of item 14 mentioned above wherein a multiple of sets of the magnetic heads and the magnetic recording media have data transferred thereamong in parallel; (37) the magnetic storage system of item 14 mentioned above wherein a mean access time is not longer than 1 msec; and, (38) the magnetic storage system of item 14 mentioned above wherein a transfer rate is not slower than 30 Mbyte/sec.

The present invention provides a third feature in that (39) a magnetic storage system having a magnetic head and a magnetic recording medium combined for reading or writing a magnetic signal as data source mentioned above wherein the magnetic recording medium has a linear or circular series of recorded bits aligned thereon and in a reading or writing mode of operation, the magnetic head is moved in a simple harmonic motion along the recorded bits while the magnetic recording medium is made still or its track is made to follow the magnetic head; (40) the magnetic storage system of item 39 mentioned above wherein the magnetic head is a multi-head having a plurality of read/write devices regularly aligned on a plane; (41) the magnetic storage system of item 39 mentioned above wherein seeking is made by a one-dimensional motion of the magnetic head in the track width direction; (42) the magnetic storage system of item 39 mentioned above wherein seeking is made by a one-dimensional motion of the magnetic head in the recording bit direction; (43) the magnetic storage system of item 39 mentioned above wherein seeking is made by a two-dimensional motion of the magnetic head in the recording bit direction and the track width direction; (44) the magnetic storage system of item 39 mentioned above wherein seeking is made by combination of a one-dimensional motion of the magnetic head in the recording bit direction and a one-dimensional motion of the magnetic recording medium in the track width direction; (45) the magnetic storage system of item 39 mentioned above wherein seeking is made by combination of a one-dimensional motion of the magnetic head in the track width direction and a one-dimensional motion of the magnetic recording medium in the recording bit direction; (46) the magnetic storage system of item 39 mentioned above wherein seeking is made by a one-dimensional motion of the magnetic recording medium in the track width direction; (47) the magnetic storage system of item 39 mentioned above wherein seeking is made by a one-dimensional motion of the magnetic recording medium in the recording bit direction; (48) the magnetic storage system of item 39 mentioned above wherein seeking is made by a two-dimensional motion of the magnetic recording medium in the recording bit direction and the track width direction; (49) the magnetic storage system of item 39 mentioned above wherein a piezo device prompts a reciprocal motion of the magnetic recording medium or the magnetic head in the recording bit direction in the reading or writing mode of operation or prompts a motion of the magnetic head or the magnetic recording medium among adjacent elements of the magnetic head in the recording track direction in a seeking operation; (50) the magnetic storage system of item 39 mentioned above wherein the magnetic recording medium is a square or a polygon of similar polygons and has regular grooves formed on a surface thereof; (51) the magnetic storage system of item 50 mentioned above wherein the magnetic recording medium is formed on a Si substrate of single crystal and the regular grooves are formed by way of a chemical etching process with use of a crystalline orientation; (52) the magnetic storage system of item 50 mentioned above wherein the magnetic recording medium is for longitudinal magnetic recording or perpendicular magnetic recording and for the longitudinal magnetic recording, an easy axis is in parallel with the recording bit direction; (53) the magnetic storage system of item 39 mentioned above wherein positioning the magnetic head or the magnetic recording medium in the track width direction in the reading or writing mode of operation is based on position information written in between sectors of a single track; (54) the magnetic storage system of item 39 mentioned above wherein positioning the magnetic head or the magnetic recording medium in the track width direction in the reading or writing mode of operation is made in a way that the magnetic head has a semiconductor laser on a part thereof, a laser beam is incident on a surface of the magnetic recording medium, and a difference of a light emission condition of the semiconductor laser with presence or absence of a groove is converted to voltage change or a change of light intensity at a rear of the laser is detected; (55) the magnetic storage system of item 39 mentioned above wherein positioning the magnetic head or the magnetic recording medium in the track width direction in the reading or writing mode of operation in a way that the magnetic head has at least one detecting needle mounted thereon, and the at least one detecting needle is brought close to a surface of the magnetic recording medium to detect a change of a tunneling current with presence or absence of a groove; (56) the magnetic storage system of item 39 mentioned above wherein positioning the magnetic head or the magnetic recording medium in the track width direction in a seeking operation is made in a way that a number of grooves on a surface of the medium is counted on the basis of a change of an emission condition of a semiconductor laser or a tunneling current with the magnetic head or the magnetic recording medium moving in the track width direction; (57) the magnetic storage system of item 39 mentioned above wherein a contact force of the magnetic head with the magnetic recording medium is controlled with use of at least one piezo device; (58) the magnetic storage system of item 39 mentioned above wherein a contact force of the magnetic head with the magnetic recording medium is different, or higher in the reading or writing mode of operation than in a seeking operation; (59) the magnetic storage system of item 39 mentioned above wherein a volume is not greater than 40 cc; (60) the magnetic storage system of item 39 mentioned above wherein a single set of the magnetic head and the magnetic recording medium has data transferred therein in parallel; (61) the magnetic storage system of item 39 mentioned above wherein a multiple of sets of the magnetic heads and the magnetic recording media have data transferred thereamong in parallel; (62) the magnetic storage system of item 39 mentioned above wherein a mean access time is not longer than 1 msec; and, (63) the magnetic storage system of item 39 mentioned above wherein a transfer rate is not slower than 30 Mbyte/sec.

The present invention provides a fourth feature in that (64) a magnetic storage system having a magnetic head and a magnetic recording medium combined for reading or writing a magnetic signal as data source mentioned above wherein the magnetic recording medium has a linear or circular series of recorded bits aligned thereon and in a reading or writing mode of operation, the magnetic head and the magnetic recording medium are moved in a simple harmonic motion along the recorded bits at phases opposite to each other while either of the magnetic head or the magnetic recording medium is made to follow a track; (65) the magnetic storage system of item 64 mentioned above wherein the magnetic head is a multi-head having a plurality of read/write devices regularly aligned on a plane; (66) the magnetic storage system of item 64 mentioned above wherein seeking is made by a one-dimensional motion of the magnetic head in the track width direction; (67) the magnetic storage system of item 64 mentioned above wherein seeking is made by a one-dimensional motion of the magnetic head in the recording bit direction; (68) the magnetic storage system of item 64 mentioned above wherein seeking is made by a two-dimensional motion of the magnetic head in the recording bit direction and the track width direction; (69) the magnetic storage system of item 64 mentioned above wherein seeking is made by combination of a one-dimensional motion of the magnetic head in the recording bit direction and a one-dimensional motion of the magnetic recording medium in the track width direction; (70) the magnetic storage system of item 64 mentioned above wherein seeking is made by combination of a one-dimensional motion of the magnetic head in the track width direction and a one-dimensional motion of the magnetic recording medium in the recording bit direction; (71) the magnetic storage system of item 64 mentioned above wherein seeking is made by a one-dimensional motion of the magnetic recording medium in the track width direction; (72) the magnetic storage system of item 64 mentioned above wherein seeking is made by a one-dimensional motion of the magnetic recording medium in the recording bit direction; (73) the magnetic storage system of item 64 mentioned above wherein seeking is made by a two-dimensional motion of the magnetic recording medium in the recording bit direction and the track width direction; (74) the magnetic storage system of item 64 mentioned above wherein a piezo device prompts a reciprocal motion of the magnetic recording medium or the magnetic head in the recording bit direction in the reading or writing mode of operation or prompts a motion of the magnetic head or the magnetic recording medium among adjacent elements of the magnetic head in the track width direction in a seeking operation; (75) the magnetic storage system of item 64 mentioned above wherein the magnetic recording medium is a square or polygon and has regular grooves formed on a surface thereof; (76) the magnetic storage system of item 75 mentioned above wherein the magnetic recording medium is formed on a Si substrate of single crystal and the regular grooves are formed by way of a chemical etching process with use of a crystalline orientation; (77) the magnetic storage system of item 75 mentioned above wherein the magnetic recording medium is for longitudinal magnetic recording or perpendicular magnetic recording and for the longitudinal magnetic recording, an easy axis is in parallel with the recording bit direction; (78) the magnetic storage system of item 64 mentioned above wherein positioning the magnetic head or the magnetic recording medium in the track width direction in the reading or writing mode of operation is based on position information written in between sectors of a single track; (79) the magnetic storage system of item 64 mentioned above wherein positioning the magnetic head or the magnetic recording medium in the track width direction in the reading or writing mode of operation is made in a way that the magnetic head has a semiconductor laser on a part thereof, a laser beam is incident on a surface of the magnetic recording medium, and a difference of a light emission condition of the semiconductor laser with presence or absence of a groove is converted to voltage change or a change of light intensity at a rear of the laser is detected; (80) the magnetic storage system of item 64 mentioned above wherein positioning the magnetic head or the magnetic recording medium in the track width direction in the reading or writing mode,of operation in a way that the magnetic head has at least one detecting needle mounted thereon, and the at least one detecting needle is brought close to a surface of the magnetic recording medium to detect a change of a tunneling current with presence or absence of a groove; (81) the magnetic storage system of item 64 mentioned above wherein positioning the magnetic head or the magnetic recording medium in the track width direction in a seeking operation is made in a way that a number of grooves on a surface of the medium is counted on the basis of a change of an emission condition of a semiconductor laser or a tunneling current with the magnetic head or the magnetic recording medium moving in the track width direction; (82) the magnetic storage system of item 64 mentioned above wherein a contact force of the magnetic head with the magnetic recording medium is controlled with use of at least one piezo device, (83) the magnetic storage system of item 64 mentioned above wherein a contact force of the magnetic head with the magnetic recording medium is different, or higher in the reading or writing mode of operation than in a seeking operation; (84) the magnetic storage system of item 64 mentioned above wherein a volume is not greater than 40 cc; (85) the magnetic storage system of item 64 mentioned above wherein a single set of the magnetic head and the magnetic recording medium has data transferred therein in parallel; (86) the magnetic storage system of item 64 mentioned above wherein a multiple of sets of the magnetic heads and the magnetic recording media have data transferred thereamong in parallel; (87) the magnetic storage system of item 64 mentioned above wherein a mean access time is not longer than 1 msec; and, (88) the magnetic storage system of item 64 mentioned above wherein a transfer rate is not slower than 30 Mbyte/sec.

The present invention provides a fifth feature in that (89) a magnetic storage system having a magnetic head and a magnetic recording medium combined for reading or writing a magnetic signal as data source mentioned above wherein the magnetic recording medium has a zigzag series of recorded bits aligned thereon and in a reading or writing mode of operation, the magnetic head and the magnetic recording medium are alternately moved in a simple harmonic motion; (90) the magnetic storage system of item 89 mentioned above wherein the magnetic head is a multi-head having a plurality of read/write devices regularly aligned on a plane; (91) the magnetic storage system of item 89 mentioned above wherein seeking is made by a one-dimensional motion of the magnetic head in the track width direction; (92) the magnetic storage system of item 89 mentioned above wherein seeking is made by a one-dimensional motion of the magnetic head in the recording bit direction; (93) the magnetic storage system of item 89 mentioned above wherein seeking is made by a two-dimensional motion of the magnetic head in the recording bit direction and the track width direction; (94) the magnetic storage system of item 89 mentioned above wherein seeking is made by combination of a one-dimensional motion of the magnetic head in the recording bit direction and a one-dimensional motion of the magnetic recording medium in the track width direction; (95) the magnetic storage system of item 89 mentioned above wherein seeking is made by combination of a one-dimensional motion of the magnetic head in the track width direction and a one-dimensional motion of the magnetic recording medium in the recording bit direction; (96) the magnetic storage system of item 89 mentioned above wherein seeking is made by a one-dimensional motion of the magnetic recording medium in the track width direction; (97) the magnetic storage system of item 89 mentioned above w herein seeking is made by a one-dimensional motion of the magnetic recording medium in the recording bit direction; (98) the magnetic storage system of item 89 mentioned above wherein seeking is made by a two-dimensional motion of the magnetic recording medium in the recording bit direction and the track width direction; (99) the magnetic storage system of item 89 mentioned above wherein a piezo device prompts a reciprocal motion of the magnetic recording medium or the magnetic head in the recording bit direction in the reading or writing mode of operation or prompts a motion of the magnetic head or the magnetic recording medium among adjacent elements of the magnetic head in the track width direction in a seeking operation; (100) the magnetic storage system of item 89 mentioned above wherein the magnetic recording medium is a square or polygon and has regular grooves formed on a surface thereof; (101) the magnetic storage system of item 100 mentioned above wherein the magnetic recording medium is formed on a Si substrate of single crystal and the regular grooves are formed by way of a chemical etching process with use of a crystalline orientation; (102) the magnetic storage system of item 100 mentioned above wherein the magnetic recording medium is for longitudinal magnetic recording or perpendicular magnetic recording and for the longitudinal magnetic recording, an easy axis is in parallel with the recording bit direction; (103) the magnetic storage system of item 89 mentioned above wherein positioning the magnetic head or the magnetic recording medium in the track width direction in the reading or writing mode of operation is based on position information written in between sectors of a single track; (104) the magnetic storage system of item 89 mentioned above wherein positioning the magnetic head or the magnetic recording medium in the track width direction in the reading or writing mode of operation is made in a way that the magnetic head has a semiconductor laser on a part thereof, a laser beam is incident on a surface of the magnetic recording medium, and a difference of a light emission condition of the semiconductor laser with presence or absence of a groove is converted to voltage change or a change of light intensity at a rear of the laser is detected; (105) the magnetic storage system of item 89 mentioned above wherein positioning the magnetic head or the magnetic recording medium in the track width direction in the reading or writing mode of operation in a way that the magnetic head has at least one detecting needle mounted thereon, and at least one detecting needle is brought close to a surface of the magnetic recording medium to detect a change of a tunneling current with presence or absence of a groove; (106) the magnetic storage system of item 89 mentioned above wherein positioning the magnetic head or the magnetic recording medium in the track width direction in a seeking operation is made in a way that a number of grooves on a surface of the medium is counted on the basis of a change of an emission condition of a semiconductor laser or a tunneling current with the magnetic head or the magnetic recording medium moving in the track width direction; (107) the magnetic storage system of item 89 mentioned above wherein a contact force of the magnetic head with the magnetic recording medium is controlled with use of at least one piezo device; (108) the magnetic storage system of item 89 mentioned above wherein a contact force of the magnetic head with the magnetic recording medium is different, or higher in the reading or writing mode of operation than in a seeking operation; (109) the magnetic storage system of item 89 mentioned above wherein a volume of the magnetic recording medium is not greater than 40 cc; (110) the magnetic storage system of item 89 mentioned above wherein a single set of the magnetic head and the magnetic recording medium has data transferred therein in parallel; (111) the magnetic storage system of item 89 mentioned above wherein a multiple of sets of the magnetic heads and the magnetic recording media have data transferred thereamong in parallel; (112) the magnetic storage system of item 89 mentioned above wherein a mean access time is not longer than 1 msec; and (113) the magnetic storage system of item 89 mentioned above wherein a transfer rate is not slower than 30 Mbyte/sec.

The reading or writing mode of operation and the seeking operation are different from each other with respect to the contact force of the read/write device with the magnetic recording medium. The problem mentioned above can be overcome in the way that the recording medium or the read/write device is driven by, for example, the piezo device, the relative motion of the head to the medium is made reciprocal, the linear or circular or zigzag aligned recorded bits are formed on the surface of the recording medium, and the recorded bits are read by the read/write device. The reciprocal motion mentioned above can be accomplished in the way that the read/write device or the recording device or the both are driven by the piezo device, the quartz crystal, or similar devices for converting the rotational motion to reciprocal motion. The magnetic head used is of multi-head type which has a plurality of read/write elements regularly formed on the plane, and the read/write elements and the recording layer of the recording medium are formed on a single-crystal Si substrate. It is preferable that the surface of the substrate to have the magnetic recording medium formed thereon has regular grooves formed in parallel with the recorded bit directions. The grooves can be formed by a chemical etching process in which the crystalline orientation is used. Positioning the magnetic head or the magnetic recording medium in the track width direction in the reading or writing mode of operation is made in a way that the magnetic head is provided with a semiconductor laser on a part thereof, a laser beam is incident on a surface of the magnetic recording medium, and a difference of a light emission condition of the semiconductor laser with presence or absence of the groove is converted to voltage change or a change of light intensity at a rear of the laser is detected. Alternatively, the positioning mentioned above can be made in a way that the magnetic head is provided with at least one detecting needle mounted thereon, and the at least one needle is brought close to a surface of the magnetic recording medium to detect a change of a tunneling current with presence or absence of the groove. Positioning the magnetic head or the magnetic recording medium in the track width direction in a seeking operation is made in a way that a number of the grooves provided on the surface of the medium is counted on the basis of a change of an emission condition of the semiconductor laser or a tunneling current with the magnetic head or the magnetic recording medium moving in the track width direction. The contact force of the magnetic head with the magnetic recording medium is controlled with use of the at least one piezo device. The contact force of the magnetic head with the magnetic recording medium is controlled so that it is higher in the reading or writing mode of operation. With combination of the processes mentioned above, we can construct the storage system so that its volume is not greater than 40 cc, data can be transferred in a single set of the magnetic head and the magnetic recording medium in parallel, or more preferably data can be transferred in a multiple of sets of the magnetic heads and the magnetic recording media in parallel, a mean access time cannot be longer than 1 msec, and the transfer rate cannot be slower than 30 Mbyte/sec.

With the relative reciprocal motion of the head to the medium, the magnetic recording medium can be shaped to a desired polygon. This means that the storage system cannot be easily made small, but also constructed to a desired shape. If the reciprocal motion of the recording medium or the head is prompted by, for example, the piezo device, high-speed data transfer can be made. If the piezo device is set to 200 $\mu$m stroke, the frequency is set to 50 kHz, and each sector of the data is set to have 256 bytes, with the magnetic recording method used, then it is possible to transfer of the data of 25 Mbyte per second. The recording data line density required is about 200 kFCI (kilo-flux changes per inch). This can be accomplished even in the longitudinal or perpendicular magnetic recording method if the spacing between the head and the medium can be made narrow to around 0.05 $\mu$m in the reading or writing mode of operation. If the multi-pattern head having the plurality of the read/write elements regularly aligned on the plane is used as the magnetic head, it can read the data from a plurality of the tracks at a time. This can further increase the data transfer rate. If a head operating area in a single reading or writing operation is limited to a narrow one, seeking can be made without moving the head. This extremely shortens the seek time because no mechanical motion involves the seeking operation.

On the other hand, if the substrate of Si single crystal is used for the medium, the regular grooves and the like can be processed at high accuracy by way of the chemical anisotropy etching process with use of its crystalline orientation. If the very smooth surface of the Si substrate also is used for the head, the spacing between the head and the medium in the reading or writing mode of operation can be kept very narrow. This is advantageous for accomplishing the high-density recording. If Si is used for the head substrate, it is possible to form the preamplifier on the plane opposite to the head device or similar ones by way of the photo-lithography process. This further facilitates making the storage system small. An accuracy of the simple harmonic motion of the head or the medium can be made very high in the way that the semiconductor laser is mounted on the part of the magnetic head to make the laser beam incident to the surface of the regularly aligned grooves, and the emission condition and the similar ones are monitored to always control the laser beam.

BRIEF DESCRIPTION OF THE DRAWINGS

In the accompanying drawings:

FIG. 9 depicts a magnetic medium with linear writing tracks each having a plurality of sectors and a servo signal or position information written between the sectors.

FIG. 10 depicts a magnetic medium with circular writing tracks.

FIG. 11 depicts a magnetic medium with zigzag writing tracks.

FIG. 12 depicts a simplified view illustrating a construction of a storage system of the present invention with a semiconductor laser used for positioning a head.

DETAILED DESCRIPTION OF THE PREFERRED EMBODIMENT

Figure 1:
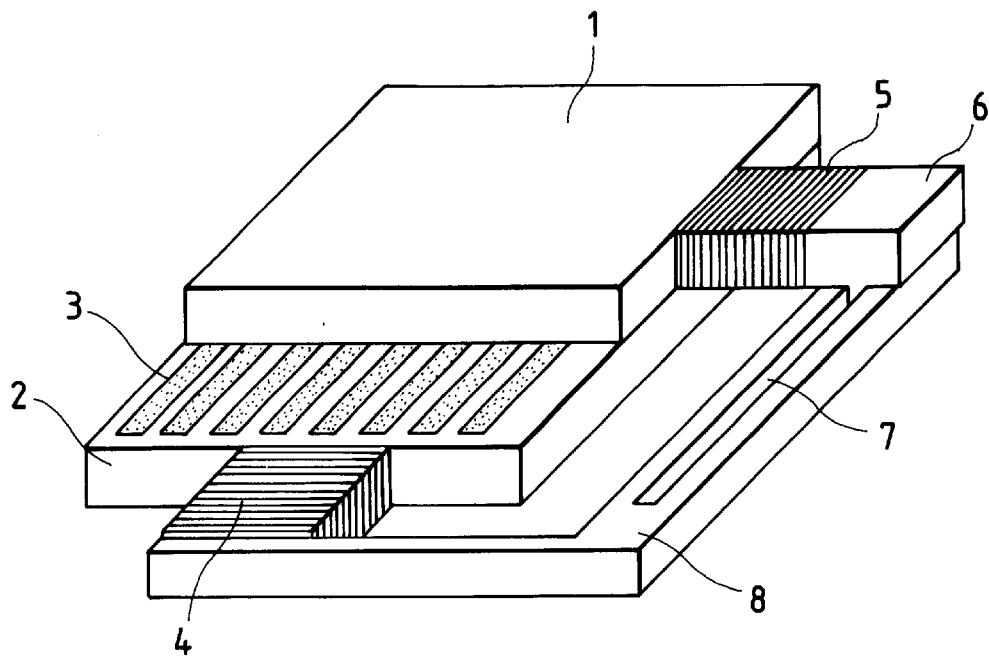
FIG. 1 depicts a view illustrating a construction of a magnetic storage system of the present invention.

The following describes in detail an embodiment according to the present invention by reference to the accompanying drawings. FIG. 1 depicts a view illustrating a construction of a magnetic signal read/write section comprising a magnetic head 1 and a magnetic medium 2 of the embodiment. The magnetic head 1 is a multi-pattern head having a plurality of read/write elements aligned regularly on a surface thereof facing the recording magnetic medium. For a seeking operation of the magnetic head 1 in a write or read mode, the magnetic head 1 is driven in a track width direction by a piezo device 5 and in a bit direction by a linear actuator comprising an arm 6 and a groove 7. The piezo device 5 also performs tracking of the head so that in the reading or writing mode of operation, the magnetic head elements can be always above a desired writting track 3 on the magnetic medium. Tracking of the magnetic head 1 is performed using magnetic data written on the magnetic medium. This can be achieved by writing a servo signal or position information onto a part of the writing track having a plurality of sectors or between the sectors as shown, for example, in FIG. 9. The recording medium 2, on the other hand, is a rectangular parallel-piped magnetic medium having a magnetic layer formed on single-crystal Si substrate. In the reading or writing mode of operation, the recording medium 2 has a simple harmonic motion induced by a vibration of a piezo device 4. The writing track 3 thus is made linear with a direction of the simple harmonic motion associated with the recording bit direction.

Although FIG. 1 shows the writing tracks 3 as linear tracks, the writing tracks 3 may be circular tracks as shown in FIG. 10 or zigzag tracks as shown in FIG. 11.

Figure 2:
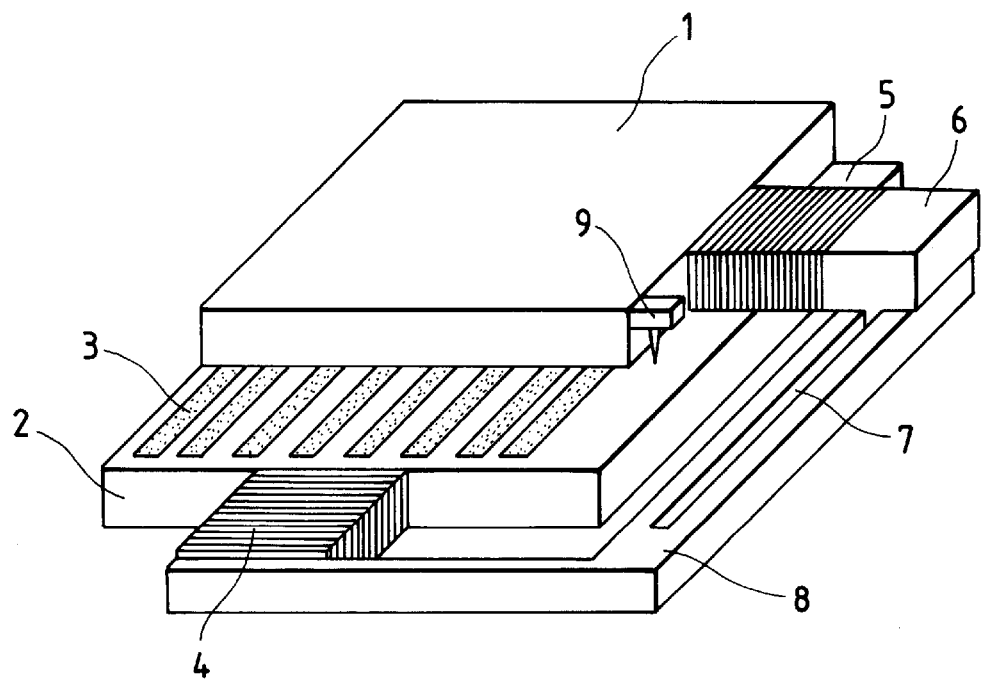
FIG. 2 depicts a simplified view illustrating a construction of a storage system of the present invention with the STM technique used for positioning a head.

FIG. 2 depicts a simplified view illustrating a construction of a read/write section where the STM (scanning tunneling microscope) is used for tracking of the magnetic head 1. In the construction, the magnetic head 1 has a detecting needle 9 at a part of a side thereof and is adjusted so that a tip of the detecting needle 9 can be close to a surface of the magnetic medium. Tracking of the head can be performed by detection of a tunneling current which changes when the head moves across grooves regularly formed on the surface of the magnetic medium. Alternatively, the detecting needle 9 on the side of the magnetic head 1 can be replaced by a semiconductor laser. In this variation, tracking is performed by detection of a light emission condition or an amount of reflected light of the semiconductor laser which changes with the physical or optical presence or absence of a groove, pit, or similar feature regularly provided on the surface of the magnetic medium.

In the embodiment described above, size of the magnetic head 1 having the plurality of elements formed on the surface thereof is substantially same as that of the magnetic medium, and seeking in the track width direction is made using only the piezo device. Alternatively, width of the magnetic head 1 may be made narrower than that of the magnetic medium. In this variation, seeking in the track width direction can be made by combination of a mechanical motion of a longer stroke of the head and the piezo device. In the illustrated embodiment, the piezo device is used to finely move the magnetic head 1 and the recording magnetic medium. Alternatively, the piezo device can be replaced by an arrangement that can convert rotational motion of, typically, a motor to simple harmonic motion through a piston or the like. In the illustrated embodiment, in the reading or writing mode of operation, the recording magnetic medium is moved in the simple harmonic motion in the recording bit direction; and, in tracking the magnetic head 1, the magnetic head 1 is moved in the track width direction. Alternatively, also in tracking the magnetic head 1, the writing magnetic medium cannot be moved in the simple harmonic motion in the recording bit direction, but also in the track width direction. In addition, the recording magnetic medium can be interchanged with the magnetic head 1 in the reading or writing mode of operation and the seeking operation in the way that in the reading or writing mode of operation, the magnetic head 1 is moved in the simple harmonic motion in the recording bit direction and in tracking the magnetic head 1, the recording magnetic medium is moved in the track width direction.

Figure 3A:
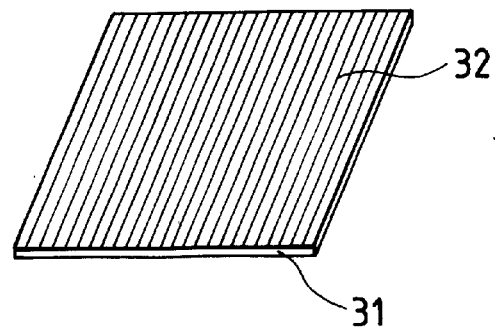
FIGS. 3(a), 3(b), and 3(c) depict views illustrating a production method for a magnetic storage system of the present invention.
Figure 3B:
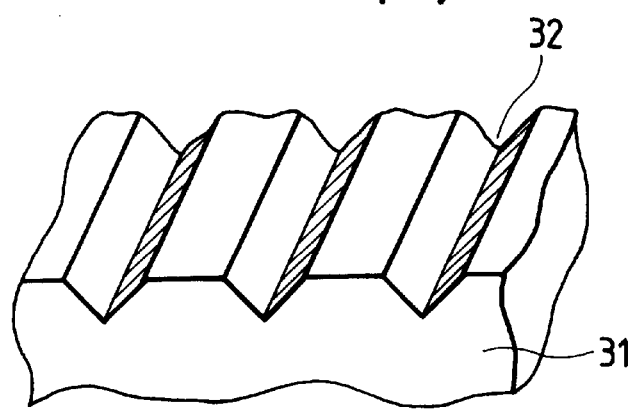
Figure 3C:
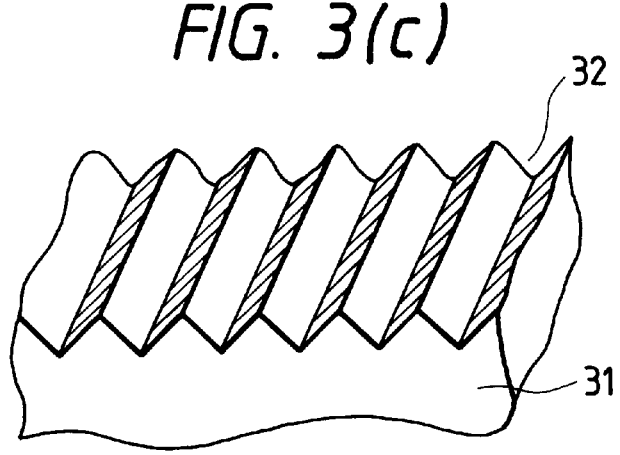

FIGS. 3(a), 3(b), and 3(c) depict views illustrating a production method of the recording magnetic medium of the present invention.

First, a resist of 0.1 μm thick is spin-coated onto a wafer substrate 31 of single crystal Si<100>. A stripe pattern having tracks of 0.25 μm wide and spaces of 0.25 μm wide then is formed by way of a photo-resist process in which the interference lithography is used. The wafer substrate 31 further is immersed in a caustic soda solution of 20% concentration to make a chemical anisotropy etching on a surface thereof. As a result, as shown in FIG. 3(b), the surface has a V-shaped groove pattern 32 of 0.125 μm deep, 0.25 μm groove wide, 0.25 μm land wide, and 0.5 μm intervals. On the V-shaped groove pattern 32 is formed a ground layer of Cr by way of the dc magnetron sputtering process. On the ground layer is formed a magnetic film of Co12.5 at % Cr-3 at % Ta of 25 nm thick. An easy axis of the magnetic film was aligned in parallel with the grooves. A coercive force of the magnetic film measured in the easy axis direction is 2,000 Oe, and a saturated magnetization of the magnetic film is 800 emu/cc. After the magnetic film is deposited, a carbon protection film of 8 nm thick is coated by way of also the sputtering process. The wafer substrate 31 having the carbon protection film coated thereon, as shown in FIG. 3(a), is cut out to a rectangular shape in parallel to and perpendicular to the orientation flat of the Si wafer. This completes preparing the magnetic medium. The magnetic medium used in the illustrated embodiment is shaped rectangular to one inch wide by 1.2 inches long. Note that cutting the Si wafer may be made at the first step of the magnetic medium preparation process described above.

Alternatively, the electron beam lithography can be used in the above-described step of forming on the resist the stripe pattern of tracks of 0.125 μm wide and spaces of 0.125 μm wide. The same anisotropy etching as mentioned above can be made on the stripe pattern to form the V-shaped groove pattern 32 as shown in FIG. 3(c). The V-shaped grooves obtained are 0.1 μm deep, 0.25 μm wide and 0.5 μm intervals. After this, we processed the wafer substrate to form the magnetic medium in the same way as above. The magnetic anisotropy of the magnetic film obtained was made wider in parallel to the grooves. Note that the grooves of the stripe pattern of the magnetic medium of the present invention may not be V-shaped. Instead, a similar very fine pattern having the same tracks and spaces as above can be formed by using a dry etching, such as milling or reactive ion etching, at the chemical anisotropy etching process mentioned above without depending on the crystalline orientation. With the use of the dry etching process, we can use Ni—P plated Al alloy substrate, glass substrate, Ti substrate, sapphire substrate, carbon substrate, plastic substrate, and similar nonmagnetic substrates. Materials available for the magnetic film mentioned above to obtain an equivalent effect include Co—Cr—Pt, Co—Cr—Nb, Co—Cr—V, Co—Cr—W, Co—Ni—Cr, Co—Cr, and similar Co alloys.

Figure 4:
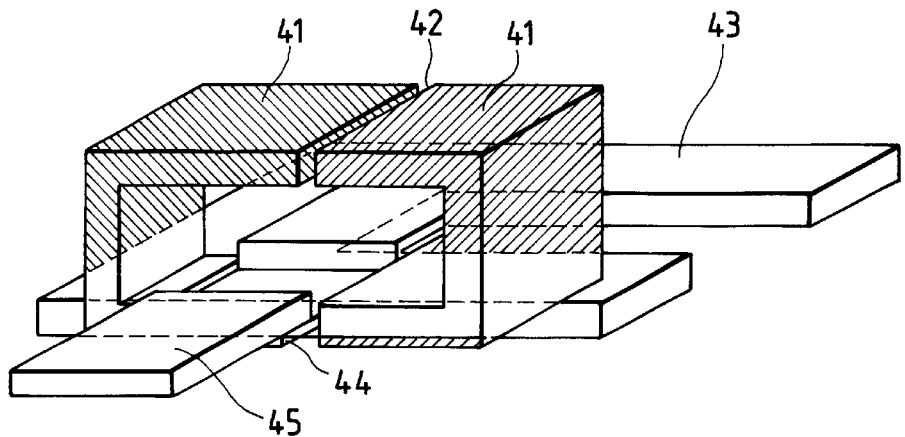
FIG. 4 depicts a simplified schematic perspective view illustrating a structure of a single magnetic head element forming a multi-pattern head for use in the present invention.

FIG. 4 depicts a simplified schematic perspective view illustrating a structure of a single magnetic head element forming the multi-pattern head fabricated in the illustrated embodiment. The magnetic head formed in the illustrated embodiment is of planar read/write separate type. For a magnetic pole film 41 forming a magnetic circuit in the reading or writing mode of operation was used permalloy of 1.0 T saturation magnetic flux density. A width of the magnetic pole film 41 facing a medium is a track width and has a gap 42 formed on a part thereof. A hard axis of the magnetic pole film 41 corresponds to a track width direction, and its coercive force measured in the direction is 0.3 Oe, and its anisotropy is lower than 5 Oe. The magnetic pole film 41 is prepared by way of combination of the plating and sputtering processes. The magnetic pole film 41 has a helical coil 43 formed to make a writing current flow. The magnetic pole film 41 is made of a Cu formed in the plating process, and its number of turns is 17. An insulating layer of resist is formed between the helical coil 43 and the helical coil 43. Opposite to the writing gap 42 is formed a reading head comprising an MR element. An area where the MR reading head is formed has a gap associated with a height of the MR element. In the gap is formed a reading film 44 comprising an MR element, a domain structure control film, and a biasing field inducing film which induces the biasing field to the MR film. A track width of the MR element, that is, a magnetism sensing portion, is limited by a pair of lead conductors 45. An easy axis of the magnetism sensing portion is in parallel with the track width direction. In the illustrated embodiment, the MR head is driven by way of the shunt-bias method to increase a reading characteristic. In order to keep stable a domain structure of the MR element, the illustrated embodiment has a permanent magnet used to apply a bias magnetic field to the MR element also in the track width direction. Films for the bias are not shown in the figure. Note that the MR element, the shunt film, and the domain structure control film are all formed by way of the sputtering process. The illustrated embodiment has a multiple of the magnetic heads of planar read/write separate type regularly formed on a surface of the Si wafer.

FIGS. 5(a), 5(b), 5(c), 5(d), 5(e), and 5(f) depict simplified schematic perspective views illustrating a production process of the planar type read/write separate head formed in the illustrated embodiment.

Figure 5A:
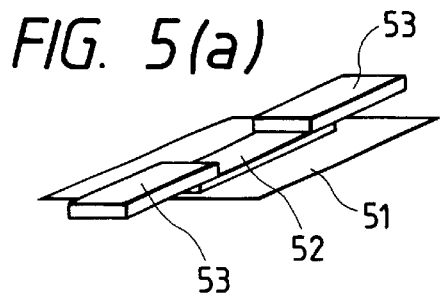
FIGS. 5(a), 5(b), 5(c), 5(d), 5(e), and 5(f) depict simplified schematic perspective views illustrating a production process of a magnetic head element of the present invention.

Referring to FIG. 5(a), the sputtering process is used to form on a Si substrate 51 a reading film 52 comprising an MR film, a domain structure control film, and a biasing field inducing film which induces the biasing field to the MR layer (film). The MR film is 15 nm thick. After sputtering the reading film 52 comprising the MR film, the domain structure control film, and the biasing field inducing film, the reading film 52 is subjected to patterning by way of the milling process in a lump so that its width and height should be 50 and 4 μm, respectively. Note that the easy axis of the MR film is determined so as to coincide with the length direction of the MR film. On the reading film 52 is formed a pair of lead wires 53 of Cu by way of the RIE (reactive ion etching) process to limit the width of the magnetism sensing portion of the lead wire film 53. The width of the magnetism sensing portion of the lead conductor film 53 in the illustrated embodiment is determined to 20 μm .

Figure 5B:
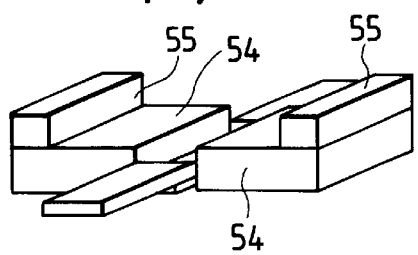

Referring to FIG. 5(b), magnetic poles 54 and 55 forming the magnetic circuit in the reading or writing mode of operation are formed by way of combination of the lift-off process and sputtering process. The magnetic poles 54 and 55 are made of permalloy. The magnetic pole 54 is shaped to 1 μm thick and 50 μm wide and long. The magnetic pole 55, on the other hand, is shaped to 5 μm thick, 50 μm wide, and 10 μm long.

Figure 5C:
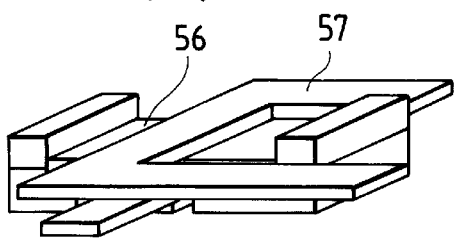

Referring to FIG. 5(c), a resist layer 56 to become insulating film is formed within the magnetic pole film 55, and its surface is made flat. After this, a helical coil 57 is formed on the resist layer 56. The helical coil 57 also is formed by way of combination of the lift-off process and sputtering process. Its number of turns is 17.

Figure 5D:
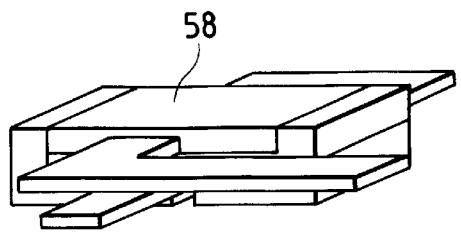

Referring to FIG. 5(d), further, a insulating layer 58 is formed on the helical coil 57. Its surface is made flat so that there should be no level difference between a top of the helical coil 57 and the magnetic pole film 55.

Figure 5E:
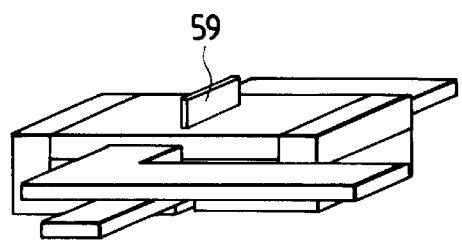
Figure 5F:
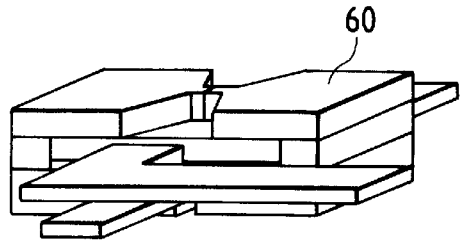
Figure 6A:
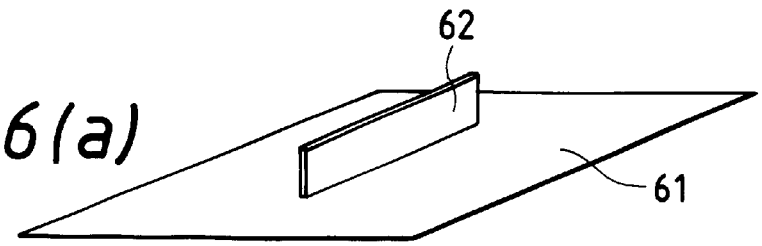
FIGS. 6(a), 6(b), 6(c), 6(d), and 6(e) depict simplified schematic perspective views illustrating another alternative production process of a magnetic head element of the present invention.
Figure 6B:
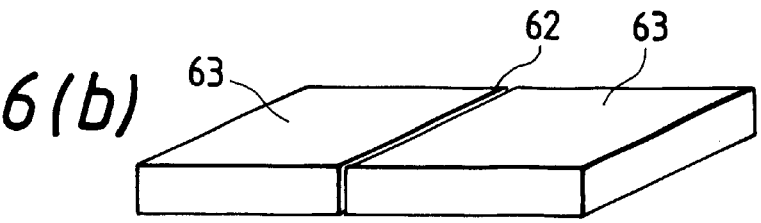
Figure 6C:
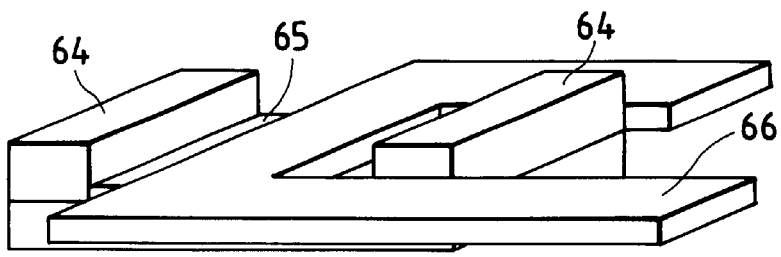
Figure 6D:
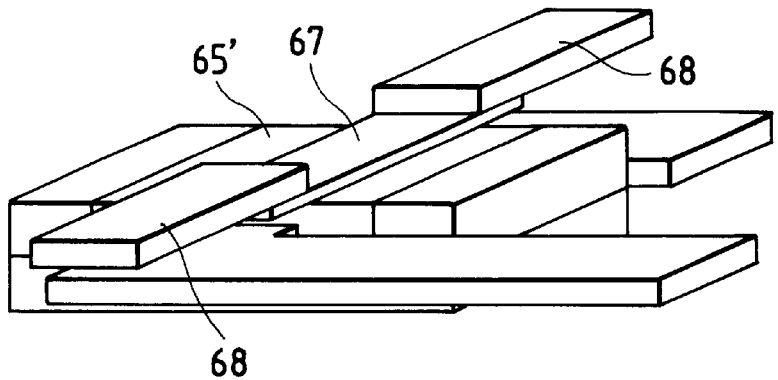
Figure 6E:
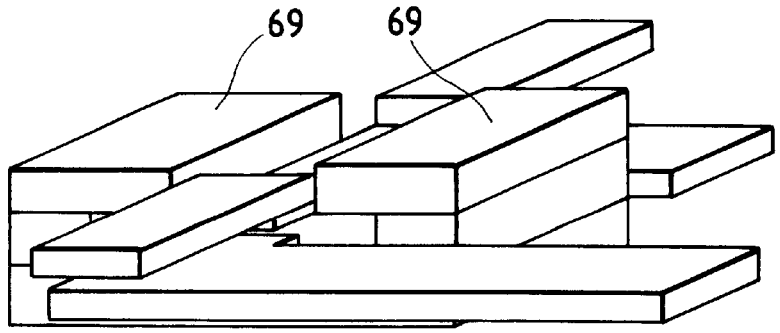

Referring to FIG. 5(e), further, a kind of resist 59 different from the insulating layer 58 is coated on the insulating layer 58 of flat surface. Etching then is made so that sections should be made in substantially perpendicular to the insulating layer 58. After this, an insulating film to become gap layer is formed by way of the sputtering process with the Si substrate inclined 45 degrees relative to the target. After sputtering the insulating film, an Ar plasma is incident in perpendicular to the Si substrate in vacuum to remove the insulating film sputtered other than the sections of the resist.

The resist then is removed to remain only a wall 59 perpendicular to the substrate. The wall 59 is 0.2 μm thick, 1 μm, and 20 μm, and is used as the magnetic gap in the reading or writing mode of operation.

Referring to FIG. 5(*f*), a permalloy film 60 of 1 mm thick is formed by way of the plating process. The permalloy film 60 is subjected to patterning by way of the milling process to form magnetic pole portions which are exposed to face the medium. The read/write section in the illustrated embodiment is determined to 0.4 μm thick. If using a focused ion beam instead of the milling, for example, we can make narrower track width than 0.1 μm. Intervals of adjacent head elements forming the multipattern head fabricated in the illustrated embodiment are 260 μm in the recording bit direction and 120 μm in the track width direction.

After completing the head element forming process described above, we should form a through hole for electrical connection of the writing coil and the MR head with the lead wires using the focused ion beam incident from the Si substrate opposite to the head element. After this, we can make up a preamplifier for controlling a write signal and magnifying a read signal on the side opposite to the head element using the ordinary photo-lithography. After completing the wafer processing, the Si substrate is cut out to a desired shape. This ends the entire head forming process. The shape in the illustrated embodiment is square, which contains more than 20,000 read/write elements.

FIGS. 6(*a*), 6(*b*), 6(*c*), 6(*d*), and 6(*e*) depict simplified schematic perspective views illustrating another alternative production process of the planer type read/write separate head formed in the illustrated embodiment.

Referring to FIG. 6(*a*), a resist is coated on a Si substrate 61, and then etching is made so that sections should be made in substantially perpendicular to the Si substrate 61. An insulating film to become gap layer is formed on the Si substrate and the resist by way of the sputtering process with the Si substrate inclined 45 degrees relative to the target. After sputtering the insulating film, an Ar plasma is incident in perpendicular to the Si substrate in vacuum to remove the insulating film sputtered other than the sections of the resist. The resist then is removed to remain only a wall 62 perpendicular to the substrate. The wall 62 is 0.2 μm thick, 1 μm, and 20 μm, and is used as the magnetic gap in the reading or writing mode of operation.

Referring to FIG. 6(*b*), a permalloy film 63 of 1 μm thick is formed on the Si substrate by way of the plating process. The permalloy film 63 is subjected to patterning by way of the milling process to form magnetic pole portions which are exposed to face the medium.

Referring to FIG. 6(*c*), magnetic poles 64 to magnetically couple with rear magnetic poles are formed by way of combination of the lift-off process and sputtering process. The magnetic poles 64 are made of permalloy. The magnetic pole 54 is shaped to 5 μm thick, 50 μm wide, and 10 μm long. In turn, a resist layer 65 to become insulating film is formed within the magnetic pole 64. A helical coil 66 is formed on the resist layer 65. The helical coil 66 also is formed by way of combination of the lift-off process and sputtering process. Its number of turns is 17.

Referring to FIG. 6(*d*), further, a resist layer 65 is formed on the helical coil 66. Its surface is made flat so that there should be no level difference between a top of the helical coil 66 and the magnetic pole 64. After this, the sputtering process is used to form a reading film 67 comprising an MR film, a domain structure control film, and a biasing field inducing film which induces the biasing field to the MR layer (film). The MR film is 15 nm thick. After sputtering the reading film 67 comprising the MR film, the domain structure control film, and the biasing field inducing film, the reading film 67 is subjected to patterning by way of the milling process in a lump so that its width and height should be 50 and 4 μm, respectively. Note that the easy axis of the MR film is determined so as to coincide with the length direction of the MR film. On the reading film 67 is formed a pair of lead conductors 68 of Cu by way of the RIE (reactive ion etching) process to limit the width of the magnetism sensing portion of the reading film 67. The width of the magnetism sensing portion of the reading film 67 in the illustrated embodiment is determined to 20 μm.

Referring to FIG. 6(*e*), with the exception of the MR portions, magnetic films 69 of 1 μm made of permalloy to become the rear magnetic poles are formed in position. After this, an alumina insulating layer is formed to 50 μm on the whole surface of the head element. We then should form a through hole for electrical connection of the writing coil and the MR head with the lead conductors using the focused ion beam from the side opposite to the head element. This ends the entire head forming process.

Figure 7:
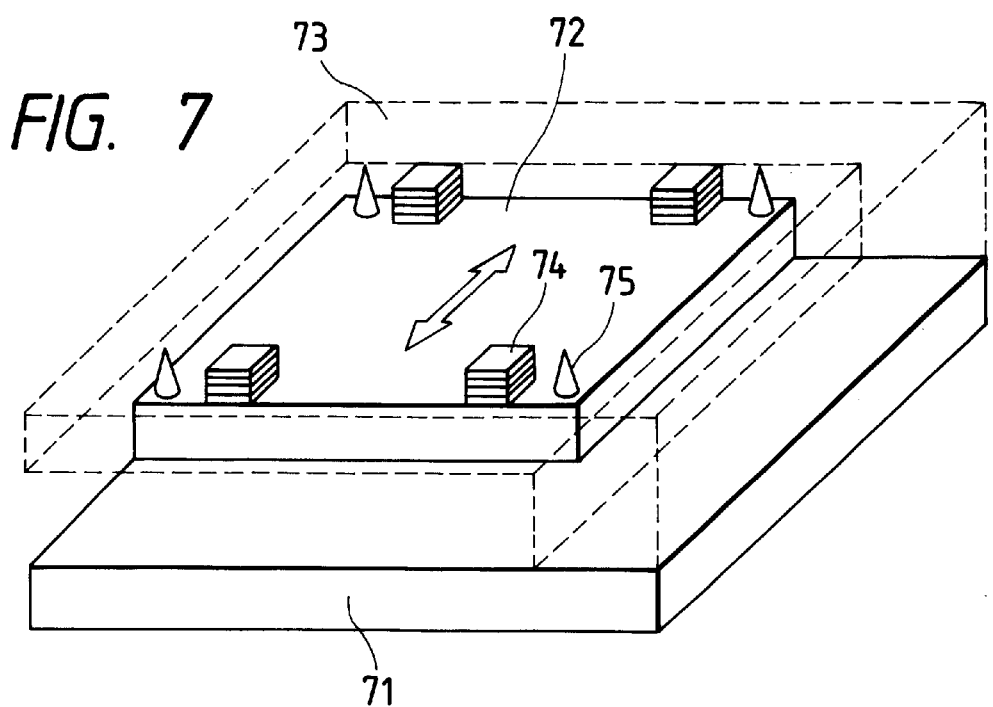
FIG. 7 depicts a perspective view for an example of arrangement for always keeping invariable a contact state of the head with the medium according to the present invention.

FIG. 7 depicts a perspective view for an example of arrangement for always keeping invariable a contact state of the head with the medium in the reading or writing mode of operation and the seeking operation. In the figure, a reference numeral 71 denotes either of a magnetic head or recording medium which does not move in simple harmonic motion in the reading or writing mode of operation. A numeral 72, on the other hand, denotes either of the magnetic head or recording medium which causes the simple harmonic motion in the reading or writing mode of operation. Assuming the numeral 71 be the recording medium, a metallic arm 73 is mounted on the recording medium 71. The arm 73 has four piezo devices 74 held on a surface thereof facing the magnetic head 72. The magnetic head 72, on the other hand, has four detecting needles 75 held on a surface thereof facing the arm 73. In such a construction of the head and medium system, a voltage is applied to the four piezo devices 74 held to the arm 73 to keep constant a tunneling current flowing through each of the detecting needles held on the four corners of the magnetic head. This can maintain invariable the contact state of the arm with the magnetic head, that is, the contact state of the magnetic head with the recording medium. With the use of the head and medium system in the illustrated embodiment, spacing between the head and the medium in the reading or writing mode of operation can be always kept narrower than 0.01 μm. It should be noted that for the seeking operation, we can make the magnetic storage system of the present invention have further higher mechanical reliability by increase the voltage applied to each piezo device to increase the tunneling current flowing through the detecting needle 75. We can use a simple mechanical spring to press the head to the medium to achieve virtually ideal contact of the head with the medium.

Figure 8:
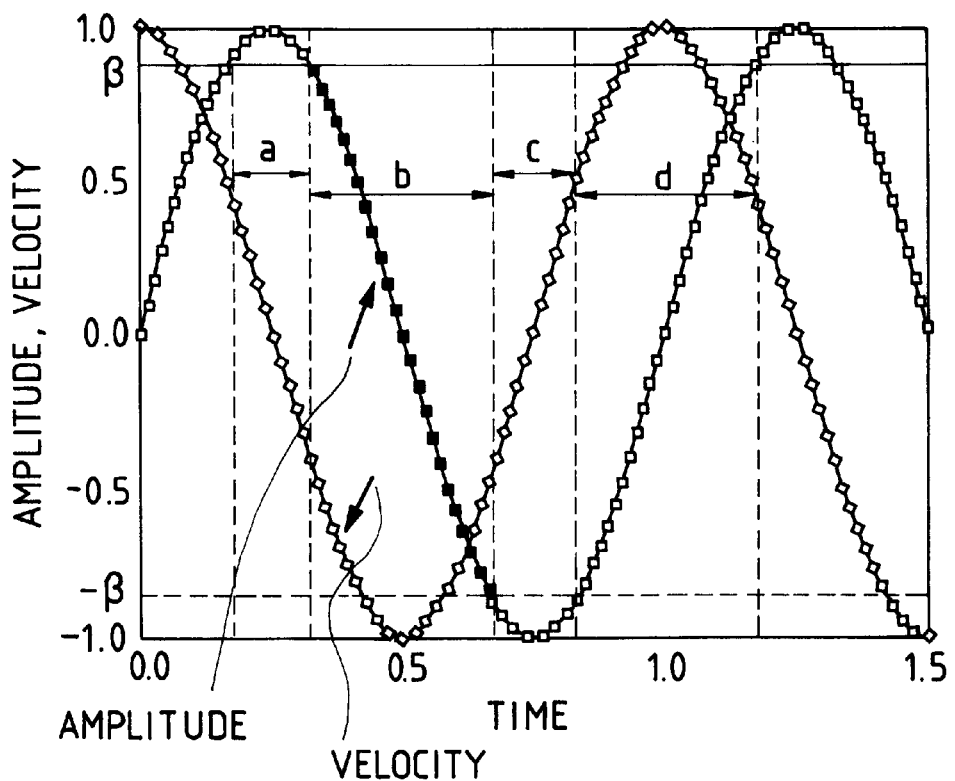
FIG. 8 depicts graphs illustrating an amplitude and a speed of the simple harmonic motion of the head relative to the medium changing with time in the reading or writing mode of operation.

FIG. 8 depicts graphs plotted with results of an amplitude and a speed of the simple harmonic motion of the head relative to the medium changing with time for a period of 1.5 cycles in the reading or writing mode of operation in the illustrated embodiment. For the simple harmonic motion, we have to determine a critical amplitude $|\beta|$, that is, a critical value of an area in which data should be written, because the speed becomes 0 to reverse its direction at the maximum amplitude. Let the maximum amplitude be 1. If the amplitude is within a range of $\beta$ to 1, the range does not allow writing the data as the speed of the medium relative to the head is too close to 0, but is available, for example, to record information for positioning the head. Let the changes of the speed and the amplitude with time be divided into zones a, b, c, and d as shown in FIG. 8. The magnetic storage system of the illustrated embodiment then operates as follows. First, the zone a in which the amplitude is higher than β does not allow writing the data, but recording information indicating the in-between sector and the information for tracking. The zone b in which the amplitude is lower than β allows writing or reading the data. Note that as the speed of the medium relative to the head changes from moment to moment, a writing frequency also can be synchronized with the relative speed to change so that a bit length in the sector can be kept constant. The result is that the track recording density can be made higher. The bit length in the sector changes if the recording frequency is made constant. A detection window width in reading the data, however, can be synchronized with the relative speed of the medium to the head to change so that reading the data can be read without error. The zone c in which the amplitude is lower than −β also does not allow writing the data therein. The zone d, on the other hand, allows reading or writing the data. In the illustrated embodiment, however, the zone d is not used for reading and writing, because the head moves in the direction opposite to the one of the zone b. Note that reading or writing can be made in any direction of the relative motion by changing an algorithm for the reading and writing operations.

In the illustrated embodiment, a stroke of the piezo device, or the highest amplitude, is determined to 280 $\mu$m, and the frequency is to be 50 kHz. The critical amplitude β is determined to be 0.93. A length of the data write area, or the sector length, thus is 260 $\mu$m. The write frequency is synchronized with the speed of the medium relative to the head to change in a range of 20 to 31 MHz. The linear recording density in each of the sectors thus is 225 kFCI, and an amount of the data in the sector is 256 bytes. The write and read operations are made at a phase at which the relative motion direction is always identical. The track width of the write head, on the other hand, is 0.4 $\mu$m. Positioning the head can be accomplished at an accuracy as high as ±0.05 $\mu$m with the use of the STM technique. The track intervals thus are 50 kTPI. The bit density is 200 kBPI with the use of the write method of 8–9 conversion. In short, an areal recording density of 10 Gb/in$^2$ is achieved. The magnetic storage system in the illustrated embodiment having the couple of head and medium has the recording capacity of 1.5 gigabytes with the use of the rectangular medium of 1.2 by 1.0 inch. A data transfer rate of the illustrated embodiment is approximately 33 megabytes per second.

The magnetic storage system in the illustrated embodiment can provide similar effects by replacing the reading and writing information source with an electric signal, physical change of the recording medium, difference of transmittance of an X-ray or electron beam to the recording medium, or light reflection or refraction.

As described so far, the present invention can accomplish the compact magnetic storage system that can record at the very high density of 10 gigabits or more per square inch.

What is claimed is:

1. A magnetic storage system comprising:

a magnetic recording medium;

a data read/write device facing the magnetic recording medium;

reciprocating means for reciprocating at least one of the data read/write device and the magnetic recording medium in a simple harmonic motion;

moving means for either (1) moving the data read/write device relative to the magnetic recording medium as the at least one of the data read/write device and the magnetic recording medium moves in the simple harmonic motion, or (2) moving the magnetic recording medium relative to the data read/write device as the at least one of the data read/write device and the magnetic recording medium moves in the simple harmonic motion; and means for maintaining a predetermined distance between the data read/write device and the magnetic recording medium.

2. A magnetic storage system comprising:

a magnetic recording medium on which bits are recorded in a bit recording direction on linear tracks disposed in a track width direction;

a magnetic head facing the magnetic recording medium;

first moving means for moving the magnetic recording medium in a simple harmonic motion in the bit recording direction during a reading or writing operation; and second moving means for moving the magnetic head to follow a selected one of the tracks as the magnetic recording medium moves in the simple harmonic motion during the reading or writing operation.

3. A magnetic storage system comprising:

a magnetic recording medium on which bits are recorded in a bit recording direction on linear tracks disposed in a track width direction;

a magnetic head facing the magnetic recording medium;

first moving means for moving the magnetic head in a simple harmonic motion in the bit recording direction during a reading or writing operation; and second moving means for moving the magnetic recording medium such that the magnetic head follows a selected one of the tracks as the magnetic head moves in the simple harmonic motion during the reading or writing operation.

4. A magnetic storage system comprising:

a magnetic recording medium on which bits are recorded in a bit recording direction on linear tracks disposed in a track width direction;

a magnetic head facing the magnetic recording medium;

first moving means for (1) moving the magnetic head in a simple harmonic motion at a first phase in the bit recording direction during a reading or writing operation, and (2) moving the magnetic recording medium in a simple harmonic motion at a second phase opposite to the first phase in the bit recording direction during the reading or writing operation; and second moving means for either (1) moving the magnetic head to follow a selected one of the tracks as the magnetic head and the magnetic recording medium move in the simple harmonic motion during the reading or writing operation, or (2) moving the magnetic recording medium such that the magnetic head follows a selected one of the tracks as the magnetic head and the magnetic recording medium move in the simple harmonic motion during the reading or writing operation.

5. A magnetic storage system comprising:

a magnetic recording medium on which bits are recorded in two mutually different bit recording directions on zigzag tracks disposed in a track width direction;

a magnetic head facing the magnetic recording medium; and moving means for alternately moving the magnetic head and the magnetic recording medium in a simple harmonic motion during a reading or writing operation.

6. A magnetic storage system according to claim 1, wherein at least one of the reciprocating means and the moving means includes (1) means for converting rotary motion to reciprocal motion, (2) a piezo device, or (3) a quartz crystal.

7. A magnetic storage system according to claim 1, wherein the magnetic recording medium has bits recorded thereon in a bit recording direction on linear tracks;

wherein the reciprocating means reciprocates the magnetic recording medium in the simple harmonic motion in the bit recording direction during a reading or writing operation; and wherein the moving means moves the data read/write device relative to the magnetic recording medium to follow a selected one of the tracks on the magnetic recording medium as the magnetic recording medium moves in the simple harmonic motion during the reading or writing operation.

8. A magnetic storage system according to claim 1, wherein the magnetic recording medium has bits recorded thereon in a bit recording direction on linear tracks;

wherein the reciprocating means reciprocates the data read/write device in the simple harmonic motion in the bit recording direction during a reading or writing operation; and wherein the moving means moves the magnetic recording medium relative to the data read/write device such that the data read/write device follows a selected one of the tracks on the magnetic recording medium as the data read/write device moves in the simple harmonic motion during the reading or writing operation.

9. A magnetic storage system according to claim 1, wherein the magnetic recording medium has bits recorded thereon in a bit recording direction on linear tracks;

wherein the reciprocating means reciprocates the magnetic recording medium in the simple harmonic motion at a first phase in the bit recording direction during a reading or writing operation, and reciprocates the data read/write device in the simple harmonic motion at a second phase opposite to the first phase in the bit recording direction during the reading or writing operation; and wherein the moving means either (1) moves the data read/write device relative to the magnetic recording medium to follow a selected one of the tracks on the magnetic recording medium as the magnetic recording medium and the data read/write device move in the simple harmonic motion during the reading or writing operation, or (2) moves the magnetic recording medium relative to the data read/write device such that the data read/write device follows a selected one of the tracks on the magnetic recording medium as the magnetic recording medium and the data read/write device move in the simple harmonic motion during the reading or writing operation.

10. A magnetic storage system according to claim 1, wherein the magnetic recording medium has bits recorded thereon in two mutually different bit recording directions on zigzag tracks; and wherein the reciprocating means reciprocates the magnetic recording medium and the data read/write device in the simple harmonic motion in respective ones of the bit recording directions during a reading or writing operation.

11. A magnetic storage system according to claim 1, wherein the data read/write device is one of a plurality of data read/write devices disposed in a regular two-dimensional arrangement in a plane.

12. A magnetic storage system according to claim 1, further comprising means for controlling at least one of the reciprocating means and the moving means to cause the data read/write device to seek a desired location on the magnetic recording medium during a seeking operation, wherein the data read/write device moves in a one-dimensional motion during the seeking operation.

13. A magnetic storage system according to claim 1, further comprising means for controlling at least one of the reciprocating means and the moving means to cause the data read/write device to seek a desired location on the magnetic recording medium during a seeking operation, wherein the data read/write device moves in a two-dimensional motion during the seeking operation.

14. A magnetic storage system according to claim 1, further comprising means for controlling at least one of the reciprocating means and the moving means to cause the data read/write device to seek a desired location on the magnetic recording medium during a seeking operation, wherein the magnetic recording medium and the data read/write device move in a one-dimensional motion during the seeking operation.

15. A magnetic storage system according to claim 1, further comprising means for controlling at least one of the reciprocating means and the moving means to cause the data read/write device to seek a desired location on the magnetic recording medium during a seeking operation, wherein the magnetic recording medium moves in a one-dimensional motion during the seeking operation.

16. A magnetic storage system according to claim 1, further comprising means for controlling at least one of the reciprocating means and the moving means to cause the data read/write device to seek a desired location on the magnetic recording medium during a seeking operation, wherein the magnetic recording medium moves in a two-dimensional motion during the seeking operation.

17. A magnetic storage system according to claim 1, further comprising means for causing the data read/write device and the magnetic recording medium to contact each other with a predetermined contact force, wherein the data read/write device and the magnetic recording medium contact each other either (1) directly or (2) indirectly through a lubricant disposed on a surface of the magnetic recording medium facing the data read/write device.

18. A magnetic storage system according to claim 2, wherein the magnetic head includes a plurality of data read/write devices disposed in a regular two-dimensional arrangement in a plane.

19. A magnetic storage system according to claim 2, further comprising means for controlling at least one of the first moving means and the second moving means to cause the magnetic head to seek a desired location on the magnetic recording medium during a seeking operation, wherein the magnetic head moves in a one-dimensional motion in the track width direction during the seeking operation.

20. A magnetic storage system according to claim 2, further comprising means for controlling at least one of the first moving means and the second moving means to cause the magnetic head to seek a desired location on the magnetic recording medium during a seeking operation, wherein the magnetic head moves in a one-dimensional motion in the bit recording direction during the seeking operation.

21. A magnetic storage system according to claim 2, further comprising means for controlling at least one of the first moving means and the second moving means to cause the magnetic head to seek a desired location on the magnetic recording medium during a seeking operation, wherein the magnetic head moves in a two-dimensional motion in the bit recording direction and the track width direction during the seeking operation.

22. A magnetic storage system according to claim 2, further comprising means for controlling at least one of the first moving means and the second moving means to cause the magnetic head to seek a desired location on the magnetic recording medium during a seeking operation, wherein the magnetic head moves in a one-dimensional motion in the bit recording direction during the seeking operation and the magnetic recording medium moves in a one-dimensional motion in the track width direction during the seeking operation.

23. A magnetic storage system according to claim 2, further comprising means for controlling at least one of the first moving means and the second moving means to cause the magnetic head to seek a desired location on the magnetic recording medium during a seeking operation, wherein the magnetic head moves in a one-dimensional motion in the track width direction during the seeking operation and the magnetic recording medium moves in a one-dimensional motion in the bit recording direction during the seeking operation.

24. A magnetic storage system according to claim 2, further comprising means for controlling at least one of the first moving means and the second moving means to cause the magnetic head to seek a desired location on the magnetic recording medium during a seeking operation, wherein the magnetic recording medium moves in a one-dimensional motion in the track width direction during the seeking operation.

25. A magnetic storage system according to claim 2, further comprising means for controlling at least one of the first moving means and the second moving means to cause the magnetic head to seek a desired location on the magnetic recording medium during a seeking operation, wherein the magnetic recording medium moves in a one-dimensional motion in the bit recording direction during the seeking operation.

26. A magnetic storage system according to claim 2, further comprising means for controlling at least one of the first moving means and the second moving means to cause the magnetic head to seek a desired location on the magnetic recording medium during a seeking operation, wherein the magnetic recording medium moves in a two-dimensional motion in the bit recording direction and the track width direction during the seeking operation.

27. A magnetic storage system according to claim 2, wherein at least one of the first moving means and the second moving means includes a piezo device;
   wherein in the first moving means, the piezo device reciprocates the magnetic recording medium in the simple harmonic motion in the bit recording direction during the reading or writing operation; and
   wherein in the second moving means, the piezo device moves the magnetic head in the track width direction to seek a desired location on the magnetic recording medium during a seeking operation.

28. A magnetic storage system according to claim 2, wherein the magnetic recording medium has a shape of a square or a polygon, and has regular grooves formed in a surface of the magnetic recording medium facing the magnetic head.

29. A magnetic storage system according to claim 28, wherein the magnetic recording medium includes a single-crystal silicon substrate, and wherein the grooves are formed in the substrate by a chemical etching process with use of a crystalline orientation.

30. A magnetic storage system according to claim 28, wherein the magnetic recording medium is either (1) a longitudinal magnetic recording medium having an easy axis oriented parallel with the bit recording direction, or (2) a perpendicular magnetic recording medium.

31. A magnetic storage system according to claim 2, wherein each of the tracks includes a plurality of sectors and position information written between the sectors; and
   wherein the second moving means moves the magnetic head in the track width direction to follow the selected track based on the position information written on the selected track.

32. A magnetic storage system according to claim 2, wherein the magnetic recording medium has grooves formed in a surface of the magnetic recording medium facing the magnetic head;
   wherein the magnetic head includes a semiconductor laser for projecting a laser beam onto the surface of the magnetic recording medium in which the grooves are formed, light from the laser beam being reflected from the surface of the recording medium;
   wherein the magnetic storage system further comprises detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves; and
   wherein the second moving means moves the magnetic head in the track width direction to follow the selected track based on the output of the detecting means.

33. A magnetic storage system according to claim 2, wherein the magnetic recording medium has grooves formed in a surface of the magnetic recording medium facing the magnetic head;
   wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle;
   wherein the magnetic storage system further comprises:
      means for causing a tunneling current to flow between the magnetic recording medium and the detecting needle; and
      detecting means for detecting a change in the tunneling current and producing an output indicative of the detected change, the detected change being indicative of a position of the detecting needle with respect to one of the grooves; and
      wherein the second moving means moves the magnetic head in the track width direction to follow the selected track based on the output of the detecting means.

34. A magnetic storage system according to claim 2, wherein the magnetic recording medium has grooves formed in a surface of the magnetic recording medium facing the magnetic head;
   wherein the magnetic head includes a semiconductor laser for projecting a laser beam onto the surface of the magnetic recording medium in which the grooves are formed, light from the laser beam being reflected from the surface of the recording medium; and wherein the magnetic storage system further comprises:

detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves;

means for controlling at least one of the first moving means and the second moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;

means for determining a current location of the magnetic head relative to the magnetic recording medium by counting a number of the grooves the magnetic head has crossed during the seeking operation based on the output of the detecting means; and means for comparing the current location of the magnetic head with the desired location on the magnetic recording medium, and terminating the seeking operation when the current location of the magnetic head is equal to the desired location on the magnetic recording medium.

35. A magnetic storage system according to claim 2, wherein the magnetic recording medium has grooves formed in a surface of the magnetic recording medium facing the magnetic head;

wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle; and wherein the magnetic storage system further comprises:

means for causing a tunneling current to flow between the magnetic recording medium and the detecting needle;

detecting means for detecting a change in the tunneling current and producing an output indicative of the detected change, the detected change being indicative of a position of the detecting needle with respect to one of the grooves;

means for controlling at least one of the first moving means and the second moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;

means for determining a current location of the magnetic head relative to the magnetic recording medium by counting a number of the grooves the magnetic head has crossed during the seeking operation based on the output of the detecting means; and means for comparing the current location of the magnetic head with the desired location on the magnetic recording medium, and terminating the seeking operation when the current location of the magnetic head is equal to the desired location on the magnetic recording medium.

36. A magnetic storage system according to claim 2, further comprising at least one piezo device for causing the magnetic head and the magnetic recording medium to contact each other with a contact force; and means for controlling the at least one piezo device such that the contact force is constant.

37. A magnetic storage system according to claim 2, further comprising:

means for controlling at least one of the first moving means and the second moving means to cause the magnetic head to seek a desired location on the magnetic recording medium during a seeking operation; and means for causing the magnetic head and the magnetic recording medium to contact each other with a first contact force during the reading or writing operation, and to contact each other with a second contact force different from the first contact force during the seeking operation.

38. A magnetic storage system according to claim 2, wherein a total volume of the magnetic storage system is not greater than 40 cc.

39. A magnetic storage system according to claim 2, wherein the magnetic head and the magnetic recording medium transfer parallel data to and from one another.

40. A magnetic storage system according to claim 2, wherein the magnetic head is one of a plurality of magnetic heads;

wherein the magnetic recording medium is one of a plurality of magnetic recording mediums; and wherein the plurality of magnetic heads and the plurality of magnetic recording mediums collectively transfer parallel data to and from one another.

41. A magnetic storage system according to claim 2, wherein the magnetic storage system provides a mean access time of not more than 1 msec.

42. A magnetic storage system according to claim 2, wherein the magnetic storage system provides a data transfer rate of not less that 30 Mbyte/sec.

43. A magnetic storage system according to claim 3, wherein the magnetic head includes a plurality of data read/write devices disposed in a regular two-dimensional arrangement in a plane.

44. A magnetic storage system according to claim 3, further comprising means for controlling at least one of the first moving means and the second moving means to cause the magnetic head to seek a desired location on the magnetic recording medium during a seeking operation, wherein the magnetic head moves in a one-dimensional motion in the track width direction during the seeking operation.

45. A magnetic storage system according to claim 3, further comprising means for controlling at least one of the first moving means and the second moving means to cause the magnetic head to seek a desired location on the magnetic recording medium during a seeking operation, wherein the magnetic head moves in a one-dimensional motion in the bit recording direction during the seeking operation.

46. A magnetic storage system according to claim 3, further comprising means for controlling at least one of the first moving means and the second moving means to cause the magnetic head to seek a desired location on the magnetic recording medium during a seeking operation, wherein the magnetic head moves in a two-dimensional motion in the bit recording direction and the track width direction during the seeking operation.

47. A magnetic storage system according to claim 3, further comprising means for controlling at least one of the first moving means and the second moving means to cause the magnetic head to seek a desired location on the magnetic recording medium during a seeking operation, wherein the magnetic head moves in a one-dimensional motion in the bit recording direction during the seeking operation and the magnetic recording medium moves in a one-dimensional motion in the track width direction during the seeking operation.

48. A magnetic storage system according to claim 3, further comprising means for controlling at least one of the first moving means and the second moving means to cause the magnetic head to seek a desired location on the magnetic recording medium during a seeking operation, wherein the magnetic head moves in a one-dimensional motion in the track width direction during the seeking operation and the magnetic recording medium moves in a one-dimensional motion in the bit recording direction during the seeking operation.

49. A magnetic storage system according to claim 3, further comprising means for controlling at least one of the first moving means and the second moving means to cause the magnetic head to seek a desired location on the magnetic recording medium during a seeking operation, wherein the magnetic recording medium moves in a one-dimensional motion in the track width direction during the seeking operation.

50. A magnetic storage system according to claim 3, further comprising means for controlling at least one of the first moving means and the second moving means to cause the magnetic head to seek a desired location on the magnetic recording medium during a seeking operation, wherein the magnetic recording medium moves in a one-dimensional motion in the bit recording direction during the seeking operation.

51. A magnetic storage system according to claim 3, further comprising means for controlling at least one of the first moving means and the second moving means to cause the magnetic head to seek a desired location on the magnetic recording medium during a seeking operation, wherein the magnetic recording medium moves in a two-dimensional motion in the bit recording direction and the track width direction during the seeking operation.

52. A magnetic storage system according to claim 3, wherein at least one of the first moving means and the second moving means includes a piezo device;
wherein in the first moving means, the piezo device reciprocates the magnetic head in the simple harmonic motion in the bit recording direction during the reading or writing operation; and
wherein in the second moving means, the piezo device moves the magnetic recording medium in the track width direction to cause the magnetic head to seek a desired location on the magnetic recording medium during a seeking operation.

53. A magnetic storage system according to claim 3, wherein the magnetic recording medium has a shape of a square or a polygon, and has regular grooves formed in a surface of the magnetic recording medium facing the magnetic head.

54. A magnetic storage system according to claim 53, wherein the magnetic recording medium includes a single-crystal silicon substrate, and wherein the grooves are formed in the substrate by a chemical etching process with use of a crystalline orientation.

55. A magnetic storage system according to claim 53, wherein the magnetic recording medium is either (1) a longitudinal magnetic recording medium having an easy axis oriented parallel with the bit recording direction, or (2) a perpendicular magnetic recording medium.

56. A magnetic storage system according to claim 3, wherein each of the tracks includes a plurality of sectors and position information written between the sectors; and
wherein the second moving means moves the magnetic recording medium in the track width direction such that the magnetic head follows the selected track based on the position information written on the selected track.

57. A magnetic storage system according to claim 3, wherein the magnetic recording medium has grooves formed in a surface of the magnetic recording medium facing the magnetic head;
wherein the magnetic head includes a semiconductor laser for projecting a laser beam onto the surface of the magnetic recording medium in which the grooves are formed, light from the laser beam being reflected from the surface of the recording medium;
wherein the magnetic storage system further comprises detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves; and
wherein the second moving means moves the magnetic recording medium in the track width direction such that the magnetic head follows the selected track based on the output of the detecting means.

58. A magnetic storage system according to claim 3, wherein the magnetic recording medium has grooves formed in a surface of the magnetic recording medium facing the magnetic head;
wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle;
wherein the magnetic storage system further comprises:
means for causing a tunneling current to flow between the magnetic recording medium and the detecting needle; and
detecting means for detecting a change in the tunneling current and producing an output indicative of the detected change, the detected change being indicative of a position of the detecting needle with respect to one of the grooves; and
wherein the second moving means moves the magnetic recording medium in the track width direction such that the magnetic head follows the selected track based on the output of the detecting means.

59. A magnetic storage system according to claim 3, wherein the magnetic recording medium has grooves formed in a surface of the magnetic recording medium facing the magnetic head;

wherein the magnetic head includes a semiconductor laser for projecting a laser beam onto the surface of the magnetic recording medium in which the grooves are formed, light from the laser beam being reflected from the surface of the recording medium; and wherein the magnetic storage system further comprises:

detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves;

means for controlling at least one of the first moving means and the second moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;

means for determining a current location of the magnetic head relative to the magnetic recording medium by counting a number of the grooves the magnetic head has crossed during the seeking operation based on the output of the detecting means; and means for comparing the current location of the magnetic head with the desired location on the magnetic recording medium, and terminating the seeking operation when the current location of the magnetic head is equal to the desired location on the magnetic recording medium.

60. A magnetic storage system according to claim 3, wherein the magnetic recording medium has grooves formed in a surface of the magnetic recording medium facing the magnetic head;

wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle; and wherein the magnetic storage system further comprises:

means for causing a tunneling current to flow between the magnetic recording medium and the detecting needle;

detecting means for detecting a change in the tunneling current and producing an output indicative of the detected change, the detected change being indicative of a position of the detecting needle with respect to one of the grooves;

means for controlling at least one of the first moving means and the second moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;

means for determining a current location of the magnetic head relative to the magnetic recording medium by counting a number of the grooves the magnetic head has crossed during the seeking operation based on the output of the detecting means; and means for comparing the current location of the magnetic head with the desired location on the magnetic recording medium, and terminating the seeking operation when the current location of the magnetic head is equal to the desired location on the magnetic recording medium.

61. A magnetic storage system according to claim 3, further comprising at least one piezo device for causing the magnetic head and the magnetic recording medium to contact each other with a contact force; and means for controlling the at least one piezo device such that the contact force is constant.

62. A magnetic storage system according to claim 3, further comprising:

means for controlling at least one of the first moving means and the second moving means to cause the magnetic head to seek a desired location on the magnetic recording medium during a seeking operation; and means for causing the magnetic head and the magnetic recording medium to contact each other with a first contact force during the reading or writing operation, and to contact each other with a second contact force different from the first contact force during the seeking operation.

63. A magnetic storage system according to claim 3, wherein a total volume of the magnetic storage system is not greater than 40 cc.

64. A magnetic storage system according to claim 3, wherein the magnetic head and the magnetic recording medium transfer parallel data to and from one another.

65. A magnetic storage system according to claim 3, wherein the magnetic head is one of a plurality of magnetic heads;

wherein the magnetic recording medium is one of a plurality of magnetic recording mediums; and wherein the plurality of magnetic heads and the plurality of magnetic recording mediums collectively transfer parallel data to and from one another.

66. A magnetic storage system according to claim 3, wherein the magnetic storage system provides a mean access time of not more than 1 msec.

67. A magnetic storage system according to claim 3, wherein the magnetic storage system provides a data transfer rate of not less that 30 Mbyte/sec.

68. A magnetic storage system according to claim 4, wherein the magnetic head includes a plurality of data read/write devices disposed in a regular two-dimensional arrangement in a plane.

69. A magnetic storage system according to claim 4, further comprising means for controlling at least one of the first moving means and the second moving means to cause the magnetic head to seek a desired location on the magnetic recording medium during a seeking operation, wherein the magnetic head moves in a one-dimensional motion in the track width direction during the seeking operation.

70. A magnetic storage system according to claim 4, further comprising means for controlling at least one of the first moving means and the second moving means to cause the magnetic head to seek a desired location on the magnetic recording medium during a seeking operation, wherein the magnetic head moves in a one-dimensional motion in the bit recording direction during the seeking operation.

71. A magnetic storage system according to claim 4, further comprising means for controlling at least one of the first moving means and the second moving means to cause the magnetic head to seek a desired location on the magnetic recording medium during a seeking operation, wherein the magnetic head moves in a two-dimensional motion in the bit recording direction and the track width direction during the seeking operation.

72. A magnetic storage system according to claim 4, further comprising means for controlling at least one of the first moving means and the second moving means to cause the magnetic head to seek a desired location on the magnetic recording medium during a seeking operation, wherein the magnetic head moves in a one-dimensional motion in the bit recording direction during the seeking operation and the magnetic recording medium moves in a one-dimensional motion in the track width direction during the seeking operation.

73. A magnetic storage system according to claim 4, further comprising means for controlling at least one of the first moving means and the second moving means to cause the magnetic head to seek a desired location on the magnetic recording medium during a seeking operation, wherein the magnetic head moves in a one-dimensional motion in the track width direction during the seeking operation and the magnetic recording medium moves in a one-dimensional motion in the bit recording direction during the seeking operation.

74. A magnetic storage system according to claim 4, further comprising means for controlling at least one of the first moving means and the second moving means to cause the magnetic head to seek a desired location on the magnetic recording medium during a seeking operation, wherein the magnetic recording medium moves in a one-dimensional motion in the track width direction during the seeking operation.

75. A magnetic storage system according to claim 4, further comprising means for controlling at least one of the first moving means and the second moving means to cause the magnetic head to seek a desired location on the magnetic recording medium during a seeking operation, wherein the magnetic recording medium moves in a one-dimensional motion in the bit recording direction during the seeking operation.

76. A magnetic storage system according to claim 4, further comprising means for controlling at least one of the first moving means and the second moving means to cause the magnetic head to seek a desired location on the magnetic recording medium during a seeking operation, wherein the magnetic recording medium moves in a two-dimensional motion in the bit recording direction and the track width direction during the seeking operation.

77. A magnetic storage system according to claim 4, wherein at least one of the first moving means and the second moving means includes at least one piezo device;

wherein in the first moving means, a first piezo device reciprocates the magnetic head in the simple harmonic motion at the first phase in the bit recording direction during the reading or writing operation, and a second piezo device reciprocates the magnetic recording medium in the simple harmonic motion at the second phase in the bit recording direction during the reading or writing operation; and wherein in the second moving means, the piezo device either (1) moves the magnetic head in the track width direction to seek a desired location on the magnetic recording medium during a seeking operation, or (2) moves the magnetic recording medium in the track width direction to seek a desired location on the magnetic recording medium during a seeking operation.

78. A magnetic storage system according to claim 4, wherein the magnetic recording medium has a shape of a square or a polygon, and has regular grooves formed in a surface of the magnetic recording medium facing the magnetic head.

79. A magnetic storage system according to claim 4, wherein the magnetic recording medium includes a single-crystal silicon substrate, and wherein the grooves are formed in the substrate by a chemical etching process with use of a crystalline orientation.

80. A magnetic storage system according to claim 4, wherein the magnetic recording medium is either (1) a longitudinal magnetic recording medium having an easy axis oriented parallel with the bit recording direction, or (2) a perpendicular magnetic recording medium.

81. A magnetic storage system according to claim 4, wherein each of the tracks includes a plurality of sectors and position information written between the sectors; and wherein the second moving means either (1) moves the magnetic head in the track width direction to follow the selected track based on the position information written on the selected track, or (2) moves the magnetic recording medium in the track width direction to follow the selected track based on the position information written on the selected track.

82. A magnetic storage system according to claim 4, wherein the magnetic recording medium has grooves formed in a surface of the magnetic recording medium facing the magnetic head;

wherein the magnetic head includes a semiconductor laser for projecting a laser beam onto the surface of the magnetic recording medium in which the grooves are formed, light from the laser beam being reflected from the surface of the recording medium;

wherein the magnetic storage system further comprises detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves; and wherein the second moving means either (1) moves the magnetic head in the track width direction to follow the selected track based on the output of the detecting means, or (2) moves the magnetic recording medium in the track width direction to follow the selected track based on the output of the detecting means.

83. A magnetic storage system according to claim 4, wherein the magnetic recording medium has grooves formed in a surface of the magnetic recording medium facing the magnetic head;

wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle;

wherein the magnetic storage system further comprises:
means for causing a tunneling current to flow between the magnetic recording medium and the detecting needle; and
detecting means for detecting a change in the tunneling current and producing an output indicative of the detected change, the detected change being indicative of a position of the detecting needle with respect to one of the grooves; and
wherein the second moving means either (1) moves the magnetic head in the track width direction to follow the selected track based on the output of the detecting means, or (2) moves the magnetic recording medium in the track width direction to follow the selected track based on the output of the detecting means.

84. A magnetic storage system according to claim 4, wherein the magnetic recording medium has grooves formed in a surface of the magnetic recording medium facing the magnetic head;
wherein the magnetic head includes a semiconductor laser for projecting a laser beam onto the surface of the magnetic recording medium in which the grooves are formed, light from the laser beam being reflected from the surface of the recording medium; and
wherein the magnetic storage system further comprises:
detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves;
means for controlling at least one of the first moving means and the second moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;
means for determining a current location of the magnetic head relative to the magnetic recording medium by counting a number of the grooves the magnetic head has crossed during the seeking operation based on the output of the detecting means; and
means for comparing the current location of the magnetic head with the desired location on the magnetic recording medium, and terminating the seeking operation when the current location of the magnetic head is equal to the desired location on the magnetic recording medium.

85. A magnetic storage system according to claim 4, wherein the magnetic recording medium has grooves formed in a surface of the magnetic recording medium facing the magnetic head;
wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle; and wherein the magnetic storage system further comprises:
means for causing a tunneling current to flow between the magnetic recording medium and the detecting needle;
detecting means for detecting a change in the tunneling current and producing an output indicative of the detected change, the detected change being indicative of a position of the detecting needle with respect to one of the grooves;
means for controlling at least one of the first moving means and the second moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;
means for determining a current location of the magnetic head relative to the magnetic recording medium by counting a number of the grooves the magnetic head has crossed during the seeking operation based on the output of the detecting means; and
means for comparing the current location of the magnetic head with the desired location on the magnetic recording medium, and terminating the seeking operation when the current location of the magnetic head is equal to the desired location on the magnetic recording medium.

86. A magnetic storage system according to claim 4, further comprising at least one piezo device for causing the magnetic head and the magnetic recording medium to contact each other with a contact force; and
means for controlling the at least one piezo device such that the contact force is constant.

87. A magnetic storage system according to claim 4, further comprising:
means for controlling at least one of the first moving means and the second moving means to cause the magnetic head to seek a desired location on the magnetic recording medium during a seeking operation; and
means for causing the magnetic head and the magnetic recording medium to contact each other with a first contact force during the reading or writing operation, and to contact each other with a second contact force different from the first contact force during the seeking operation.

88. A magnetic storage system according to claim 4, wherein a total volume of the magnetic storage system is not greater than 40 cc.

89. A magnetic storage system according to claim 4, wherein the magnetic head and the magnetic recording medium transfer parallel data to and from one another.

90. A magnetic storage system according to claim 4, wherein the magnetic head is one of a plurality of magnetic heads;
wherein the magnetic recording medium is one of a plurality of magnetic recording mediums; and
wherein the plurality of magnetic heads and the plurality of magnetic recording mediums collectively transfer parallel data to and from one another.

91. A magnetic storage system according to claim 4, wherein the magnetic storage system provides a mean access time of not more than 1 msec.

92. A magnetic storage system according to claim 4, wherein the magnetic storage system provides a data transfer rate of not less that 30 Mbyte/sec.

93. A magnetic storage system according to claim 5, wherein the magnetic head includes a plurality of data read/write devices disposed in a regular two-dimensional arrangement in a plane.

94. A magnetic storage system according to claim 5, further comprising means for controlling the moving means to cause the magnetic head to seek a desired location on the magnetic recording medium during a seeking operation, wherein the magnetic head moves in a one-dimensional motion in the track width direction during the seeking operation.

95. A magnetic storage system according to claim 5, further comprising means for controlling the moving means to cause the magnetic head to seek a desired location on the magnetic recording medium during a seeking operation, wherein the magnetic head moves in a one-dimensional motion in one of the bit recording directions during the seeking operation.

96. A magnetic storage system according to claim 5, further comprising means for controlling the moving means to cause the magnetic head to seek a desired location on the magnetic recording medium during a seeking operation, wherein the magnetic head moves in a two-dimensional motion in the track width direction and one of the bit recording directions during the seeking operation.

97. A magnetic storage system according to claim 5, further comprising means for controlling the moving means to cause the magnetic head to seek a desired location on the magnetic recording medium during a seeking operation, wherein the magnetic head moves in a one-dimensional motion in one of the bit recording directions during the seeking operation and the magnetic recording medium moves in a one-dimensional motion in the track width direction during the seeking operation.

98. A magnetic storage system according to claim 5, further comprising means for controlling the moving means to cause the magnetic head to seek a desired location on the magnetic recording medium during a seeking operation, wherein the magnetic head moves in a one-dimensional motion in the track width direction during the seeking operation and the magnetic recording medium moves in a one-dimensional motion in one of the bit recording directions during the seeking operation.

99. A magnetic storage system according to claim 5, further comprising means for controlling the moving means to cause the magnetic head to seek a desired location on the magnetic recording medium during a seeking operation, wherein the magnetic recording medium moves in a one-dimensional motion in the track width direction during the seeking operation.

100. A magnetic storage system according to claim 5, further comprising means for controlling the moving means to cause the magnetic head to seek a desired location on the magnetic recording medium during a seeking operation, wherein the magnetic recording medium moves in a one-dimensional motion in one of the bit recording directions during the seeking operation.

101. A magnetic storage system according to claim 5, further comprising means for controlling the moving means to cause the magnetic head to seek a desired location on the magnetic recording medium during a seeking operation, wherein the magnetic recording medium moves in a two-dimensional motion in the track width direction and one of the bit recording directions during the seeking operation.

102. A magnetic storage system according to claim 5, wherein the moving means includes:
   a first piezo device for reciprocating the magnetic head in the simple harmonic motion in a first one of the bit recording directions during the reading or writing operation; and
   a second piezo device for reciprocating the magnetic recording medium in the simple harmonic motion in a second one of the bit recording directions during the reading or writing operation; and
   wherein the magnetic storage system further comprises a third piezo device for moving the magnetic head in the track width direction to seek a desired location on the magnetic recording medium during a seeking operation.

103. A magnetic storage system according to claim 5, wherein the magnetic recording medium has a shape of a square or a polygon, and has regular grooves formed in a surface of the magnetic recording medium facing the magnetic head.

104. A magnetic storage system according to claim 103, wherein the magnetic recording medium includes a single-crystal silicon substrate, and wherein the grooves are formed in the substrate by a chemical etching process with use of a crystalline orientation.

105. A magnetic storage system according to claim 103, wherein the magnetic recording medium is either (1) a longitudinal magnetic recording medium having an easy axis oriented parallel with one of the bit recording directions, or (2) a perpendicular magnetic recording medium.

106. A magnetic storage system according to claim 5, wherein each of the tracks includes a plurality of sectors and position information written between the sectors; and
   wherein the magnetic storage system further comprises second moving means for either (1) moving the magnetic head to follow a selected one of the tracks as the magnetic head and the magnetic recording medium move in the simple harmonic motion during the reading or writing operation, or (2) moving the magnetic recording medium such that the magnetic head follows a selected one of the tracks as the magnetic head and the magnetic recording medium move in the simple harmonic motion during the reading or writing operation.

107. A magnetic storage system according to claim 5, wherein the magnetic recording medium has grooves formed in a surface of the magnetic recording medium facing the magnetic head;
   wherein the magnetic head includes a semiconductor laser for projecting a laser beam onto the surface of the magnetic recording medium in which the grooves are formed, light from the laser beam being reflected from the surface of the recording medium; and
   wherein the magnetic storage system further comprises:
      detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves; and
      second moving means for either (1) moving the magnetic head to follow a selected one of the tracks as the magnetic head and the magnetic recording medium move in the simple harmonic motion during the reading or writing operation based on the output of the detecting means, or (2) moving the magnetic recording medium such that the magnetic head follows a selected one of the tracks as the magnetic head and the magnetic recording medium move in the simple harmonic motion during the reading or writing operation based on the output of the detecting means.

108. A magnetic storage system according to claim 5, wherein the magnetic recording medium has grooves formed in a surface of the magnetic recording medium facing the magnetic head;
  wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle;
  wherein the magnetic storage system further comprises:
    means for causing a tunneling current to flow between the magnetic recording medium and the detecting needle;
    detecting means for detecting a change in the tunneling current and producing an output indicative of the detected change, the detected change being indicative of a position of the detecting needle with respect to one of the grooves; and
    second moving means for either (1) moving the magnetic head to follow a selected one of the tracks as the magnetic head and the magnetic recording medium move in the simple harmonic motion during the reading or writing operation based on the output of the detecting means, or (2) moving the magnetic recording medium such that the magnetic head follows a selected one of the tracks as the magnetic head and the magnetic recording medium move in the simple harmonic motion during the reading or writing operation based on the output of the detecting means.

109. A magnetic storage system according to claim 5, wherein the magnetic recording medium has grooves formed in a surface of the magnetic recording medium facing the magnetic head;
  wherein the magnetic head includes a semiconductor laser for projecting a laser beam onto the surface of the magnetic recording medium in which the grooves are formed, light from the laser beam being reflected from the surface of the recording medium; and
  wherein the magnetic storage system further comprises:
    detecting means for detecting a change in either (1) a light emission condition of the semiconductor laser, or (2) a change in an amount of the light reflected from the surface of the magnetic recording medium, and producing an output indicative of the detected change, the detected change being indicative of a position of the laser beam on the surface of the magnetic recording medium with respect to one of the grooves;
    means for controlling the moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;
    means for determining a current location of the magnetic head relative to the magnetic recording medium by counting a number of the grooves the magnetic head has crossed during the seeking operation based on the output of the detecting means; and
    means for comparing the current location of the magnetic head with the desired location on the magnetic recording medium, and terminating the seeking operation when the current location of the magnetic head is equal to the desired location on the magnetic recording medium.

110. A magnetic storage system according to claim 5, wherein the magnetic recording medium has grooves formed in a surface of the magnetic recording medium facing the magnetic head;
  wherein the magnetic head includes at least one detecting needle extending toward the surface of the magnetic recording medium in which the grooves are formed, the at least one detecting needle having an end disposed sufficiently close to the surface of the magnetic recording medium to enable a tunneling current to flow between the magnetic recording medium and the detecting needle; and
  wherein the magnetic storage system further comprises:
    means for causing a tunneling current to flow between the magnetic recording medium and the detecting needle;
    detecting means for detecting a change in the tunneling current and producing an output indicative of the detected change, the detected change being indicative of a position of the detecting needle with respect to one of the grooves;
    means for controlling the moving means to cause the magnetic head to seek a desired location on the magnetic recording medium during a seeking operation, wherein relative movement in the track width direction occurs between the magnetic head and the magnetic recording medium during the seeking operation such that the magnetic head crosses at least one of the grooves during the seeking operation;
    means for determining a current location of the magnetic head relative to the magnetic recording medium by counting a number of the grooves the magnetic head has crossed during the seeking operation based on the output of the detecting means; and
    means for comparing the current location of the magnetic head with the desired location on the magnetic recording medium, and terminating the seeking operation when the current location of the magnetic head is equal to the desired location on the magnetic recording medium.

111. A magnetic storage system according to claim 5, further comprising at least one piezo device for causing the magnetic head and the magnetic recording medium to contact each other with a contact force; and
  means for controlling the at least one piezo device such that the contact force is constant.

112. A magnetic storage system according to claim 5, further comprising:
  means for controlling the moving means to cause the magnetic head to seek a desired location on the magnetic recording medium during a seeking operation; and means for causing the magnetic head and the magnetic recording medium to contact each other with a first contact force during the reading or writing operation, and to contact each other with a second contact force different from the first contact force during the seeking operation.

113. A magnetic storage system according to claim 5, wherein a total volume of the magnetic storage system is not greater than 40 cc.

114. A magnetic storage system according to claim 5, wherein the magnetic head and the magnetic recording medium transfer parallel data to and from one another.

115. A magnetic storage system according to claim 5, wherein the magnetic head is one of a plurality of magnetic heads;

wherein the magnetic recording medium is one of a plurality of magnetic recording mediums; and wherein the plurality of magnetic heads and the plurality of magnetic recording mediums collectively transfer parallel data to and from one another.

116. A magnetic storage system according to claim 5, wherein the magnetic storage system provides a mean access time of not more than 1 msec.

117. A magnetic storage system according to claim 5, wherein the magnetic storage system provides a data transfer rate of not less that 30 Mbyte/sec.

* * * * *